(12) United States Patent
Mathews et al.

(10) Patent No.: US 12,314,323 B2
(45) Date of Patent: *May 27, 2025

(54) DATA VISUALIZATION USER INTERFACE WITH SEAMLESS ONLINE AND OFFLINE USER INTERACTION

(71) Applicant: Tableau Software, Inc., Seattle, WA (US)

(72) Inventors: Michael Mathews, Issaquah, WA (US); Ryan Whitney, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/584,197

(22) Filed: Jan. 25, 2022

(65) Prior Publication Data

US 2022/0147199 A1    May 12, 2022

Related U.S. Application Data

(63) Continuation of application No. 16/166,019, filed on Oct. 19, 2018, now Pat. No. 11,232,159.

(51) Int. Cl.
  *G06F 16/904*    (2019.01)
  *G06F 16/9035*   (2019.01)
  (Continued)

(52) U.S. Cl.
  CPC ........ *G06F 16/904* (2019.01); *G06F 16/9035* (2019.01); *G06F 16/9574* (2019.01); *G06F 40/103* (2020.01); *G06F 40/117* (2020.01)

(58) Field of Classification Search
  CPC . G06F 16/904; G06F 16/9035; G06F 16/9574
  See application file for complete search history.

(56) References Cited

U.S. PATENT DOCUMENTS

| 7,526,561 B2 | 4/2009 | Bloch |
| 8,825,749 B2 | 9/2014 | Tully |

(Continued)

OTHER PUBLICATIONS

Matthews, Preinterview First Office Action, U.S. Appl. No. 16/166,019, filed Aug. 20, 2020, 4 pgs.

(Continued)

*Primary Examiner* — Miranda Le
(74) *Attorney, Agent, or Firm* — Morgan, Lewis & Bockius LLP

(57) ABSTRACT

A method implements data visualization offline interaction. A user requests a data visualization, and sends the request to a server. The method receives a data model needed to render the data visualization and a data visualization library. The method stores the data model and data visualization library in memory. The method generates the data visualization based on the data model using the data visualization library, and displays the data visualization in a data visualization interface. A user manipulates the data visualization. If there is no connectivity with the server, indicating offline mode, and the user input corresponds to functionality that is available in the offline mode, the method retrieves the stored data model and data visualization library and generates an updated data visualization based on the data model using the visualization library. The updated data visualization is displayed in the data visualization interface.

16 Claims, 16 Drawing Sheets

(51) Int. Cl.
*G06F 16/957* (2019.01)
*G06F 40/103* (2020.01)
*G06F 40/117* (2020.01)

(56) References Cited

U.S. PATENT DOCUMENTS

| | | | |
|---|---|---|---|
| 8,856,767 B2* | 10/2014 | Jalan | G06F 11/3419 |
| | | | 717/157 |
| 8,959,476 B2 | 2/2015 | Ramani | |
| 9,003,059 B2 | 4/2015 | Ozzie | |
| 9,049,247 B2 | 6/2015 | Holloway | |
| 9,197,696 B1 | 11/2015 | Jakatdar | |
| 9,398,077 B2* | 7/2016 | Bosworth | G06F 12/0875 |
| 10,127,516 B2* | 11/2018 | Bennett | G06F 3/04842 |
| 10,789,257 B2* | 9/2020 | Dhollander | G05B 19/41875 |
| 11,019,144 B2* | 5/2021 | Berger | H04L 67/1095 |
| 11,709,852 B2* | 7/2023 | Duffield | G06F 9/451 |
| | | | 707/722 |
| 2005/0188051 A1 | 8/2005 | Sneh | |
| 2007/0033569 A1 | 2/2007 | Davidson | |
| 2009/0037523 A1 | 2/2009 | Kolke | |
| 2011/0145286 A1* | 6/2011 | LaRowe | G06F 16/951 |
| | | | 715/705 |
| 2012/0271709 A1* | 10/2012 | Ogawa | G06Q 30/0242 |
| | | | 705/14.42 |
| 2012/0297030 A1 | 11/2012 | Knobe | |
| 2015/0161224 A1* | 6/2015 | LaRowe | G06F 16/90335 |
| | | | 707/776 |
| 2017/0255341 A1* | 9/2017 | Trefler | G06F 3/04842 |
| 2017/0331915 A1 | 11/2017 | Jann | |
| 2018/0088566 A1* | 3/2018 | Billi-Duran | G05B 19/41885 |
| 2018/0246497 A1* | 8/2018 | Wolf | G05B 19/4068 |

OTHER PUBLICATIONS

Matthews, Final Office Action, U.S. Appl. No. 16/166,019, filed Feb. 1, 2021, 18 pgs.
Matthews, Notice of Allowance, U.S. Appl. No. 16/166,019, filed Sep. 15, 2021, 18 pgs.

* cited by examiner

DATA VISUALIZATION USER INTERFACE WITH SEAMLESS ONLINE AND OFFLINE USER INTERACTION

CROSS-REFERENCE TO RELATED APPLICATIONS

This application is a continuation of U.S. patent application Ser. No. 16/166,019, filed Oct. 19, 2018, entitled "Data Visualization User Interface with Seamless Online and Offline User Interaction," which is incorporated by reference herein in its entirety.

TECHNICAL FIELD

The disclosed implementations relate generally to data visualization and more specifically to systems, methods, and user interfaces that implement data visualization offline interactions.

BACKGROUND

Data visualization applications enable a user to understand a data set visually, including distribution, trends, outliers, and other factors that are important to making business decisions. Some data sets are very large or complex, so the process of analyzing a data set, loading the data set, and displaying a corresponding data visualization can be slow. The process is also slow when a user chooses to change what data is displayed or how the data is displayed.

Data visualizations are often viewed on client devices (e.g., mobile devices). Sometimes, the client devices are disconnected from servers (e.g., a database server) that host data and service client requests. For example, when a client device is outside of a corporate network or when the client device is roaming, the client device loses connectivity with the server. In such cases, the client device is either unable to service user requests for data visualizations or only provide limited user interactions. Moreover, if a client device is connected to a server and then disconnected, or if the client device is initially disconnected from the server and then connected, a user experiences abrupt transition or disruption when interacting with a data visualization.

SUMMARY

Disclosed implementations address the above deficiencies and other problems associated with data visualization offline interactions.

In accordance with some implementations, a method of data visualization offline interaction is performed at a computer having a display, one or more processors, and memory storing one or more programs. The one or more programs are configured for execution by the one or more processors. The process receives a request from a user for a data visualization. The data visualization is based on a data set retrieved from a database using a set of one or more queries. The process sends the user request for the data visualization to a server. The server is communicatively coupled to the computer. The process receives a visualization payload from the server. The visualization payload includes a data model with data for rendering the data visualization and a data visualization library corresponding to the data model. In some implementations, the data in the data model is aggregated at the level of granularity needed to render the data visualization. In some implementations, the data model contains only the data necessary to show the set of active data marks. In some implementations, the data in the data model is sorted and/or filtered.

The process stores the visualization payload in memory using a caching mechanism. The process generates the data visualization based on the data model using the data visualization library. The process displays a data visualization user interface and displays the data visualization in the data visualization interface. The process detects user input corresponding to a user interface command manipulating the data visualization. The process determines whether the computer has connectivity with the server or not (i.e., indicating whether the device is in online mode or offline mode). In accordance with a determination that the computer has no connectivity with the server, the process determines whether the user interface command corresponds to functionality that is available in the offline mode. In accordance with a determination that the functionality is available in the offline mode, the process retrieves the stored visualization payload using the caching mechanism, generates a response to the user input based on the data model using the visualization library in the stored visualization payload, and displays the response in the data visualization interface. The response is typically an updated data visualization.

In some instances, the process receives a request from the user for the data visualization. In response to receiving the request for the data visualization, the process determines whether the computer has connectivity with the server. In accordance with a determination that the computer has no connectivity with the computer, the process (i) retrieves the stored visualization using the caching mechanism, (ii) generates the data visualization based on the data model using the data visualization library in the stored visualization payload, (iii) displays the data visualization user interface and (iv) displays the data visualization in the data visualization interface.

In some implementations, the process detects user input that designates the data visualization as a favorite. The process determines whether the computer has connectivity with the server. In accordance with a determination that the computer has connectivity with the server, at a predefined time interval, the process sends a request to the server for an updated data model corresponding to the stored visualization payload, and updates the data model in the stored visualization payload.

In some implementations, the data model includes a timestamp of when the data model was created, and the process determines whether the computer has connectivity with the server. In accordance with a determination that the computer has no connectivity with the server, the process updates the data visualization user interface to indicate the timestamp for the data model.

In some implementations, the functionality that is available in the offline mode includes highlighting, brushing, and/or displaying tooltip information about data marks.

In some implementations, the process determines whether the computer has connectivity with the server. In accordance with a determination that the computer has connectivity with the server, at a predetermined time interval, the process sends a request to the server for an updated data visualization library corresponding to the stored visualization payload, and updates the data visualization library in the stored visualization payload.

In some implementations, the process determines whether the functionality requires additional data in the data model. In accordance with a determination that the functionality requires additional data, the process sends a request to the server, for the additional data, generates a response to the user input based on the additional data using the visualization library in the stored visualization payload, and displays the response in the data visualization interface. In some implementations, the process also updates the data in the data model in the stored visualization payload with the additional data from the server.

In some implementations, the process determines whether the user interface command corresponds to functionality that is only partially available in the offline mode. In accordance with a determination that the functionality is only partially available in the offline mode, the process retrieves the stored visualization payload using the caching mechanism, generates a response to the user input for the part functionality that is available in the offline mode based on the data model using the visualization library in the stored visualization payload, and displays the response in the data visualization interface. In some implementations, the process determines whether the computer has connectivity with the server. In accordance with a determination that the computer has connectivity with the server, the process: (i) sends a request to the server, for an updated visualization payload for the part functionality that is available only in online mode; (ii) receives an updated visualization payload from the server; (iii) generates a response to the user input based on the data model using the visualization library in the updated visualization payload; and (iv) displays the response in the data visualization interface. In some implementations, the process also updates the stored visualization payload based on the updated visualization payload received from the server. In some implementations, the process determines whether the computer has connectivity with the server. In accordance with a determination that the computer has connectivity with the server, the process (i) sends a request to the server for an updated visualization payload for the part functionality that is available only in online mode, (ii) receives an updated visualization payload from the server, (iii) generates a response to the user input based on the data model using the visualization library in the updated visualization payload, and (iv) displays the response in the data visualization interface. In some implementations, the process also updates the stored visualization payload based on the updated visualization payload received from the server.

In some implementations, the process determines whether the computer has connectivity with the server. In accordance with a determination that the computer has no connectivity with the server, the process updates the data visualization user interface to indicate the functionality that is unavailable in the offline mode. In some implementations, the process indicates, in the data visualization user interface, via a tooltip for the user interface command, that the functionality is not available in the offline mode. In some implementations, the process allows the user to select, in the data visualization user interface, the functionality that is unavailable in the offline mode but shows an explanatory popup indicating that the functionality is unavailable.

In some implementations, the data visualization library is configured to determine whether the computer has connectivity with the server, and implements functionality in offline and online mode so that the offline mode is executed when the server is offline and the online mode is executed when the server is online.

In accordance with some implementations, a system for data visualization offline interaction includes a display, one or more processors, memory, and one or more programs stored in the memory. The programs are configured for execution by the one or more processors. The programs include instructions for performing any of the methods described herein.

In accordance with some implementations, a non-transitory computer-readable storage medium stores one or more programs configured for execution by a computer system having a display, one or more processors and memory. The one or more programs include instructions for performing any of the methods described herein.

Thus methods, systems, and graphical user interfaces are provided that implement data visualization offline interaction.

BRIEF DESCRIPTION OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

Figure 1:
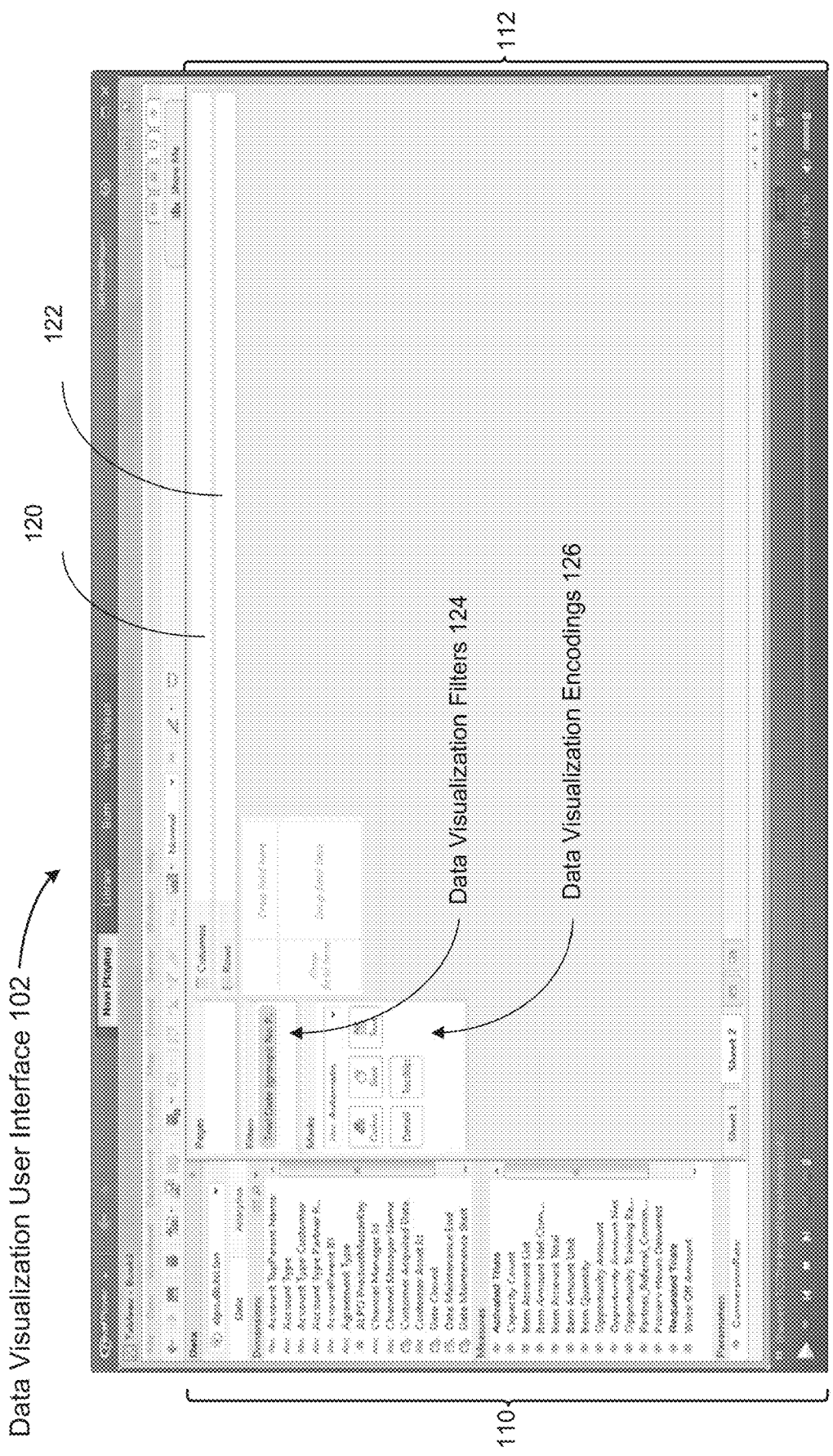
FIG. 1 provides an example data visualization user interface according to some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Disclosed implementations provide various benefits for interactive data analysis by providing a system and method for offline interactions with data visualization.

On a mobile client (e.g., Tableau Mobile), users can view snapshots of their favorite visualizations when the client is offline. However, snapshots are static images, and provide little or no interactivity to users. A user can also create two different versions of a data visualization—one visualization for online use (e.g., when the client is connected to a server), and another visualization for offline use. However, this is burdensome for the user and leads to cumbersome implementations (for e.g., due to the need for supporting different flows). Offline visualizations implemented in this manner are stored on user or client devices and remain static.

In disclosed implementations, on the other hand, a user creates the one version of the visualization. A server, or a server in coordination with a mobile client, automatically determines a version (e.g., a simplified version) of the online visualization for an offline scenario (e.g., when a client is disconnected from the server). Thus, disclosed implementations provide a seamless offline experience for users. Additionally, when the client device is connected back to the server, and the client learns about the network or the server (and there is available network bandwidth), disclosed implementations automatically update the offline version of the data visualization with additional data and/or features. This provides a dynamic interactive framework for users. Also, the server packages all of the necessary files for offline interaction together. The client then allows users to interact with the data visualization without the need for a live connection to a data source. The package from the server embeds an offline interactive visualization in a presentation or a file, for example. The embedded visualization is not a static image, but instead is a functional visualization supporting user interactions. In some implementations, after a user interacts and modifies a version of the offline visualization, the server manages package versioning when the client device is connected to the server. Therefore, the client device only downloads the differences between the offline version and a more updated version on the server, without the need for downloading the whole package again.

Disclosed implementations provide interactions on an offline mobile device using commands in the web client that are executed locally without requiring a round trip to the server. In order to distinguish commands that can be executed locally from other commands that require a trip to the server, the commands are intercepted. However, web rendering processes on a mobile client (e.g., WKWebView on the iOS™) do not provide an interface for applications to intercept its network traffic. For example, when a visualization web link (e.g., an URL) is sent from a first process (e.g., Ackbar on iOS™) to a web rendering process (e.g., WKWebView), it loads the page in a separate networking process, and thus there is no way to intercept the network traffic. The first process cannot override the behavior of the web rendering process. According to some implementations, to overcome this issue, an in-process HTTP server corresponding to the first process serves cached payloads of visualizations to the web rendering process.

FIG. 1 shows a data visualization user interface 102 in accordance with some implementations. The user interface 102 includes a schema information region 110, which is also referred to as a data pane. The schema information region 110 provides named data elements (field names) that may be selected and used to build a data visualization. In some implementations, the list of field names is separated into a group of dimensions and a group of measures (typically numeric quantities). Some implementations also include a list of parameters. The graphical user interface 102 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic. Because no data elements have been selected yet, the space initially has no visual graphic.

A user selects one or more data sources 106 (which may be stored on the computing device 200, described below in reference to FIG. 2, or stored remotely), selects data fields from the data sources 106, and uses the selected fields to define a visual graphic. In some implementations, the information the user provides is stored as a visual specification 228 (described below in reference to FIG. 2). In some implementations, the data visualization application 222 includes a data visualization virtual machine, which takes a data flow graph, and renders a corresponding visual graphic (data visualization). The data visualization application 222 displays the generated graphic in the data visualization region 112.

Figure 2:
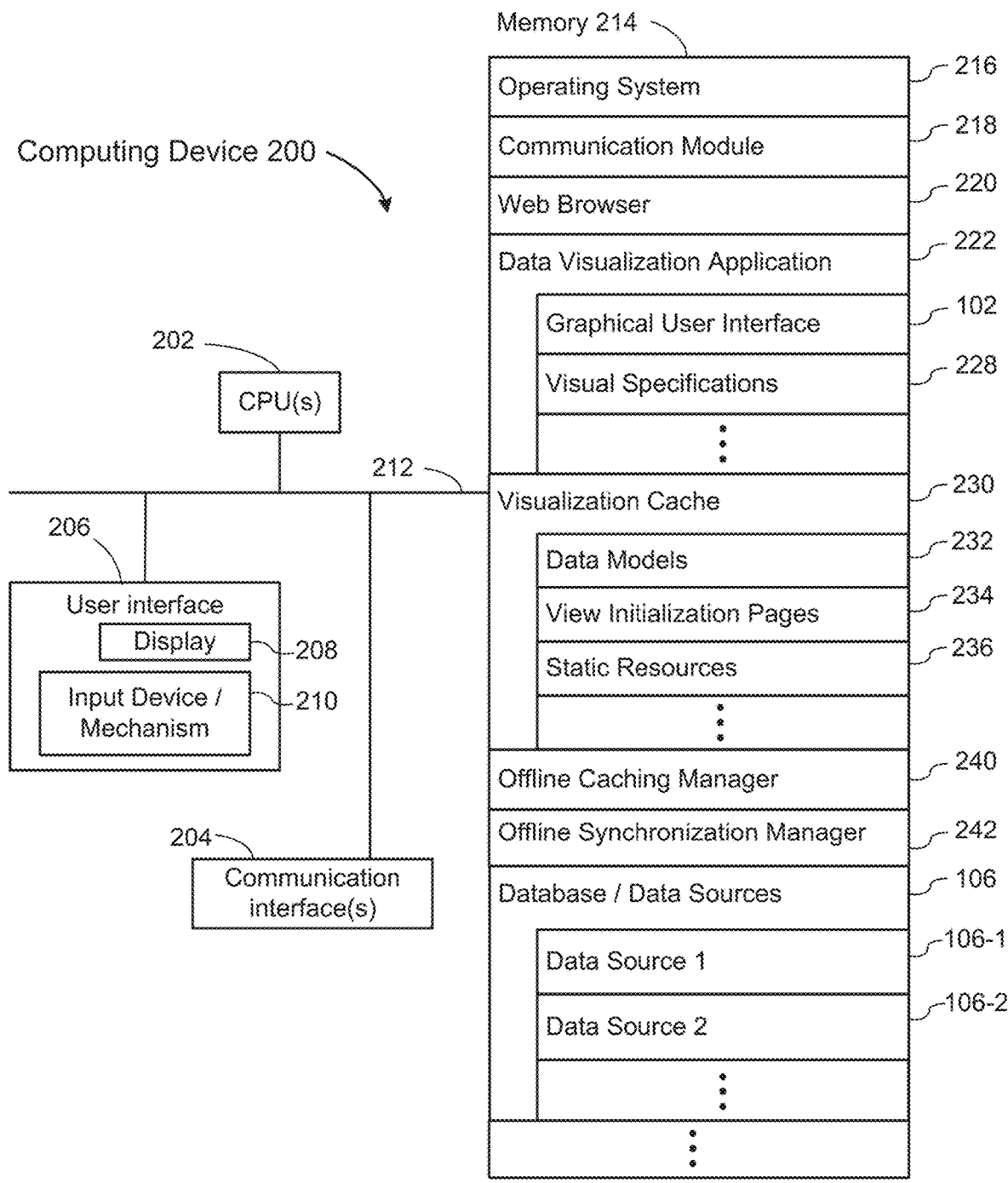
FIG. 2 is a block diagram illustrating a computing device 200 according to some implementations.

FIG. 2 is a block diagram illustrating a computing device 200, which may be used for data visualization offline interactions, according to some implementations. A computing device may display a graphical user interface 102 for the data visualization application 222. Computing devices 200 include desktop computers, laptop computers, tablet computers, and other computing devices with a display and a processor capable of running a data visualization application 222. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 includes a user interface 206 comprising a display device 208 and one or more input devices or mechanisms 210. In some implementations, the input device/mechanism includes a keyboard; in some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory devices within the memory 214, comprises a non-transitory computer-readable storage medium. In some implementations, the memory 214, or the computer-readable storage medium of the memory 214, stores the following programs, modules, and data structures, or a subset thereof:

- an operating system 216, which includes procedures for handling various basic system services and for performing hardware dependent tasks;
- a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other client application), which enables a user to communicate over a network with remote computers or devices;
- a data visualization application 222, which provides a graphical user interface 102 for a user to construct visual graphics (e.g., an individual data visualization or a dashboard with a plurality of related data visualizations). In some implementations, the data visualization application 222 executes as a standalone application (e.g., a desktop application). In some implementations, the data visualization application 222 executes within the web browser 220 (e.g., as a web application 322).

In some implementations, each data visualization is built according to a visual specification 228, which specifies characteristics of the data visualization according to user selected data fields and the association of those data fields with shelves in the user interface 102;

zero or more databases or data sources 106 (e.g., a first data source 106-1 and a second data source 106-2), which are used by the data visualization application 222. In some implementations, the data sources can be stored as spreadsheet files, CSV files, XML files, flat files, or as tables in a relational database;

a visualization cache 230, which stores visualization payloads downloaded (or received) from a visualization server 300. In some implementations, the visualization cache 230 stores offline data models 232, view initialization pages 234, and static resources 236. Typically, the visualization cache is stored in non-volatile memory;

an offline caching manager 240, which caches and serves visualization payloads as described below in reference to FIG. 4B; and an offline synchronization manager 242, which manages downloading and updating visualization payloads (or the components within payloads, including data models 232, view initialization pages 234, and/or static resources 236). In some implementations, the offline synchronization manager is triggered at predefined time intervals (e.g., by a user of the client device 200 setting a time interval). In some implementations, a user of the client device 200 marks (via the user interface 206) one or more data visualizations as favorites, and the offline synchronization manager 242 automatically fetches and updates the corresponding payloads for the data visualization at predefined time intervals.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as functional description of the various features that may be present rather than as a structural schematic of the implementations described herein. In practice, and as recognized by those of ordinary skill in the art, items shown separately could be combined and some items could be separated.

Figure 3:
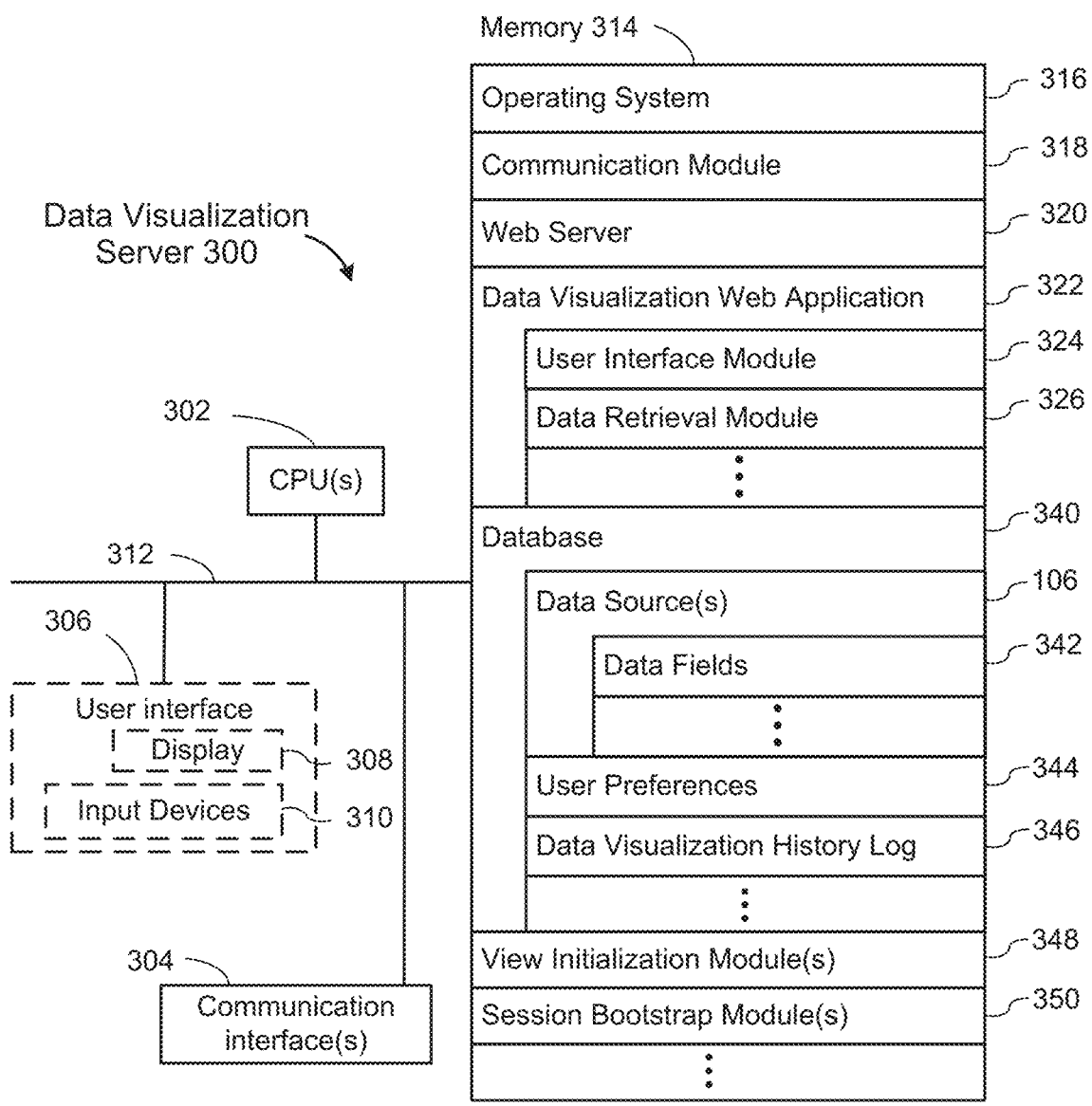
FIG. 3 is a block diagram of a data visualization server according to some implementations.

FIG. 3 is a block diagram of a data visualization server, which implements data visualization offline interactions, according to some implementations. A data visualization server 300 may host one or more databases 340 or may provide various executable applications or modules. A server 300 typically includes one or more processing units/cores (CPUs) 302, one or more network interfaces 304, memory 314, and one or more communication buses 312 for interconnecting these components. In some implementations, the server 104 includes a user interface 306, which includes a display device 308 and one or more input devices 310, such as a keyboard and a mouse. In some implementations, the communication buses 312 may include circuitry (sometimes called a chipset) that interconnects and controls communications between system components.

In some implementations, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternatively the non-volatile memory device(s) within the memory 314, comprises a non-transitory computer-readable storage medium.

In some implementations, the memory 314 or the computer-readable storage medium of the memory 314 stores the following programs, modules, and data structures, or a subset thereof:

an operating system 316, which includes procedures for handling various basic system services and for performing hardware dependent tasks;

a network communication module 318, which is used for connecting the server 300 to other computers via the one or more communication network interfaces 304 (wired or wireless) and one or more communication networks, such as the Internet, other wide area networks, local area networks, metropolitan area networks, and so on;

a web server 320 (such as an HTTP server), which receives web requests from users and responds by providing responsive web pages or other resources;

a data visualization web application 322, which may be downloaded and executed by a web browser 220 on a user's computing device 200. In general, a data visualization web application 322 has the same functionality as a desktop data visualization application 222, but provides the flexibility of access from any device at any location with network connectivity, and does not require installation and maintenance. In some implementations, the data visualization web application 322 includes various software modules to perform certain tasks. In some implementations, the web application 322 includes a user interface module 324, which provides the user interface for all aspects of the web application 322. In some implementations, the web application includes a data retrieval module 326, which builds and executes queries to retrieve data from one or more data sources 106. The data sources 106 may be stored in a database 340 on the server 300 or stored in an external database. In some implementations, data from two or more data sources may be blended. In some implementations, the data retrieval module 326 uses a visual specification 228 to build the queries;

one or more databases 340, which store data used or created by the data visualization web application 322 or data visualization application 222. The databases 340 may store data sources 106, which provide the data used in the generated data visualizations. In some implementations, the databases 340 include a data visualization history log 346. In some implementations, the history log tracks each time a virtual machine is run to render a data visualization;

a view initialization module 348, which initializes a session and returns a web page (e.g., a HTML page) with embedded library code (e.g., Javascript and/or CSS code). In some implementations, the embedded library code (e.g., Javascript) contains logic for calculating bootstrap parameters. More details are provided below in reference to FIGS. 5A and 5B; and a session bootstrap module 350, which generates and returns a data model to the client 200. In some implementations, embedded library code (e.g., Javascript) makes an asynchronous call (e.g., an Ajax call) and passes in bootstrap parameters. The server 300 builds the data model and returns it. More details are provided below in reference to FIGS. 5A and 5B.

The databases 340 may store data in many different formats, and commonly include many distinct tables, each with a plurality of data fields 342. Some data sources comprise a single table. The data fields 342 include both raw fields from the data source (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 342 are stored separately from the data source 106. In some implementations, the database 340 stores a set of user preferences 344 for each user. The user preferences may be used when the data visualization web application 322 or the data visualization application 222 makes recommendations about how to view a set of data fields 342. In some implementations, the database 340 stores a data visualization history log 346, which stores information about each data visualization generated. In some implementations, the database 340 stores other information, including other information used by the data visualization application 222 or data visualization web application 322. The databases 340 may be separate from the data visualization server 300, or may be included with the data visualization server (or both).

In some implementations, the data visualization history log 346 stores the visual specifications selected by users, which may include a user identifier, a timestamp of when the data visualization was created, a list of the data fields used in the data visualization, the type of the data visualization (sometimes referred to as a "view type" or a "chart type"), data encodings (e.g., color and size of marks), the data relationships selected, and what connectors are used. In some implementations, one or more thumbnail images of each data visualization are also stored. Some implementations store additional information about created data visualizations, such as the name and location of the data source, the number of rows from the data source that were included in the data visualization, the version of the data visualization software, and so on.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 shows a data visualization server 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically colocated (e.g., the individual physical devices could be spread throughout the United States or throughout the world).

Example Mobile Client Implementations

In some implementations, at a mobile client, several components or modules provide offline interactions. The components include a background task to retrieve visualization payloads from the server 300. For example, on iOS™, Ackbar uses background tasks to fetch sheet images from the server 300 for all visualizations marked as favorites by the user. Some implementations use background tasks to fetch offline visualization payloads from the server 300. These payloads are special payloads, and the retrieval process signals the server to return the visualization in offline mode. Another component that provides offline interactions in some implementations is a local visualization payload cache. A visualization typically includes server-scoped static resources (e.g., CSS and JavaScript), a view initialization page (e.g., an HTML5 page with inline CSS and inline JavaScript or JS), and a data model (sometimes referred to as a presentation model or a "pres" model). The server-scoped static resources are shared across all visualizations on a given server. Therefore, the server-scoped static resources need to be downloaded only once from the server 300 (e.g., as part of an initial download of a visualization payload).

Figure 4A:
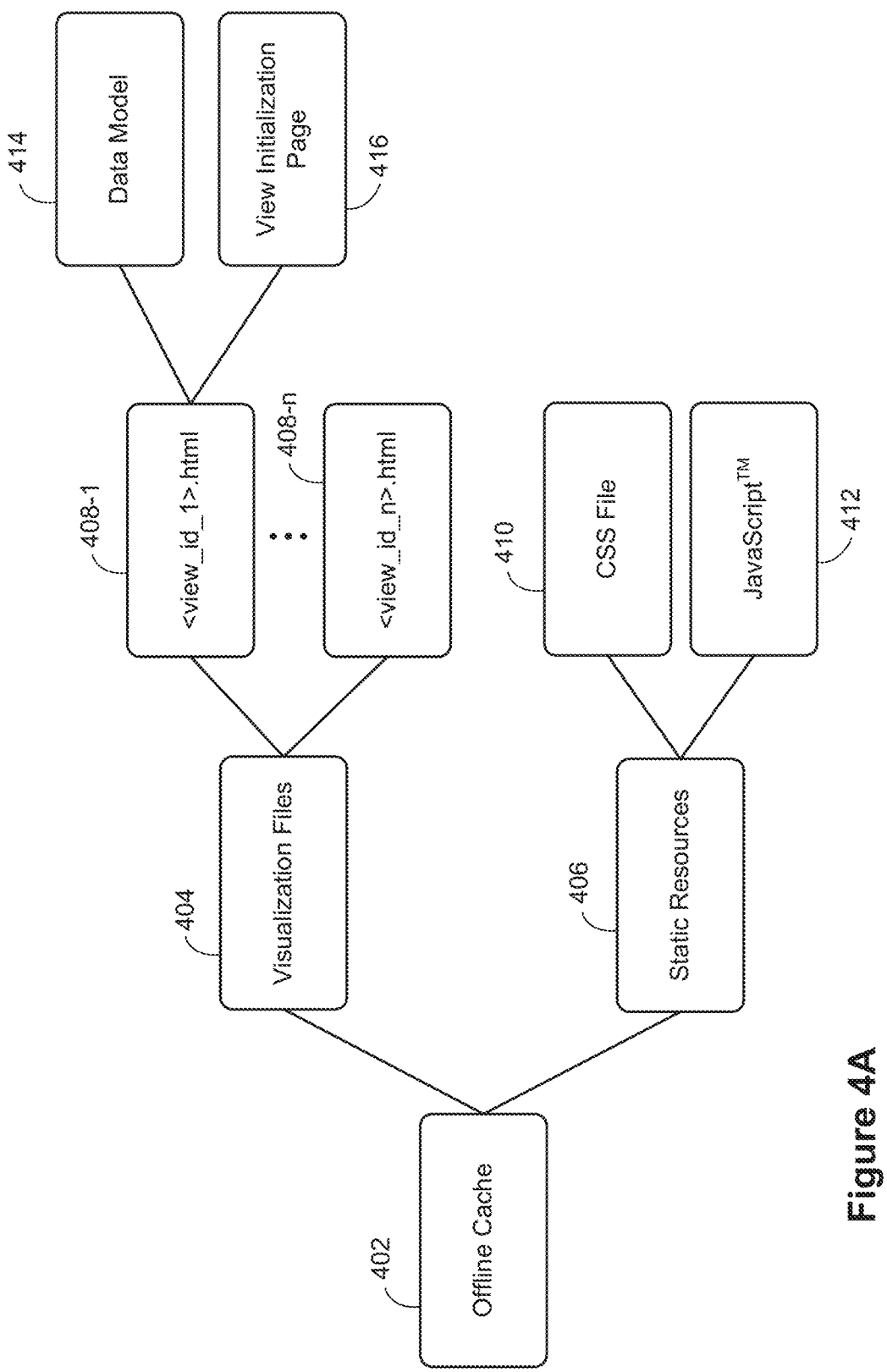
FIG. 4A illustrates a file structure used to support offline interactions according to some implementations.
Figure 4B:
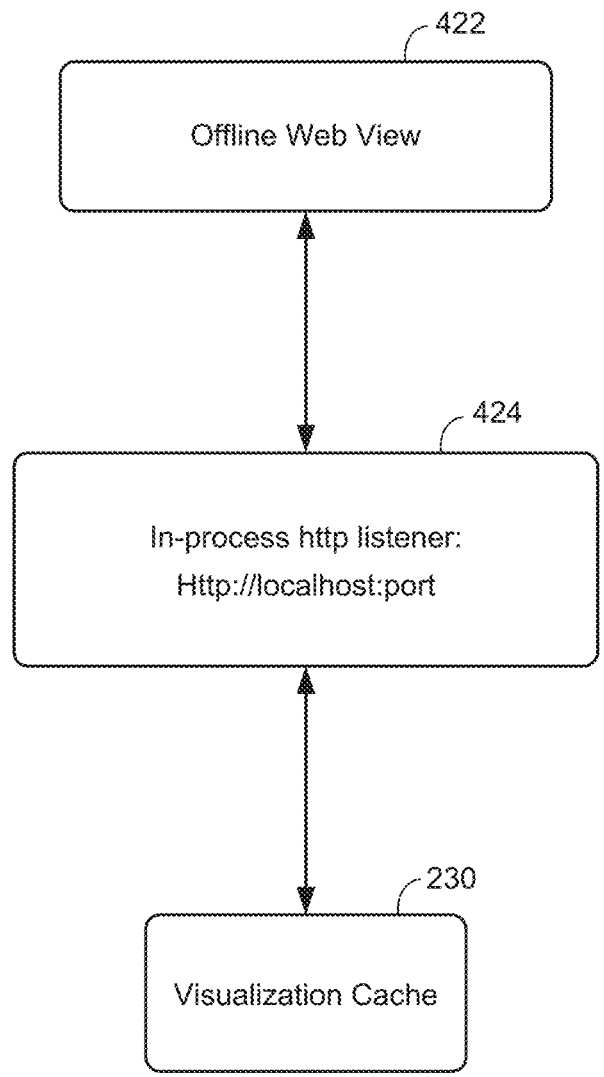
FIG. 4B illustrates an implementation of a caching mechanism that caches and serves offline web view payloads of visualizations, according to some implementations.

FIG. 4A illustrates a file system organization, according to some implementations. As shown, visualization payloads are stored in an offline cache 402 (e.g., visualization cache 230). In some implementations, a visualization folder 404 contains visualization payloads for all offline visualizations. In some implementations, file names 408 for each file in the visualization folder 404 have a ".html" suffix and have a prefix that is a view identifier (a unique identifier of a data visualization). In this example, there are n files 408-1, . . . , 408-n. In some implementations, each file in the visualization folder contains both a view initialization page 416 (e.g., an HTML5 page) and an embedded data model 414. The Offline cache 402 also stores static data 406. As previously described, the server static resources 406 are shared across all visualizations, and contain both CSS files 410 and Javascript 412. In some implementations, a client process (e.g., Ackbar on iOS™) retrieves a compressed (e.g., zipped) package of static resources from the server, and inflates the compressed file to this second folder (e.g., a folder named server_static_resources). In some implementations, a built-in application (sometimes called an in-process application, such as an in-app HTTP server) serves cached visualization payloads to an offline web rendering processes on the mobile client (e.g., WKWebView in iOS™). Note that the "cache" here may be allocated in non-volatile memory FIG. 4B illustrates an implementation of a caching mechanism that caches and serves offline web view payloads of visualizations, according to some implementations. In some implementations, an in-process http listener 424 acts as a middle man between an offline web view rendering process 422 and the cache 230. The cache serves offline web view payloads of visualizations, according to some implementations. As an example of how this architecture works, instead of visiting "http://tableau.example.com", an offline web view rendering process 422 will visit "localhost://". As shown in FIG. 4B, Ackbar's in-app HTTP server 424 will respond with the cached visualization payload, according to some implementations.

In some implementations, an offline cache that stores visualizations is updated in a manner similar to how snapshots are updated. In some implementations, when a user signs out of a server (e.g., a client goes offline), a process on the client, such as the Ackbar application in FIG. 4B, clears an offline cache. When the user signs back onto the server, the client starts a background task to fetch favorite visualizations in offline mode, according to some implementations. The background task runs on the client (e.g., at predefined intervals) and requests a server for the latest offline payloads for favorite visualizations, according to some implementations. In some implementations, the server supports push notifications and pushes a notification to the client when the server has upgraded or downgraded, or when one or more of the favorite visualizations has changed. Subsequently, or simultaneously, the client starts the background task to fetch the updated payloads, according to some implementations.

In some instances, the majority of the client components for implementing offline interactions are shared across platforms (e.g., across iOS™ and Android™ platforms). For example, the components described above, including the offline data model, the offline cache mechanism, the offline synchronization manager, and the offline local web server share much of the code and the functionality across platforms, according to some implementations. In some implementations, to circumvent conflicts between Xamarin's implementation of a .Net HttpServer and Android's native implementation of the HttpClient (which provides support for Kerberos on Android), the offline local web server (sometimes called the client) is implemented using Android's native stack. For example, in some implementations, user interface workflow and application integration for offline components (e.g., local web server, cache) are implemented specific to a platform.

Example Server Implementations

As explained above, a mobile client requests a data visualization from a server and caches the content needed for loading a visualization. According to some implementations, a workflow for loading a data visualization (sometimes called a live view) includes view initialization where the server initializes the session and returns a web page (e.g., an HTML, page with embedded JavaScript and CSS). In some implementations, the JavaScript code contains logic for calculating bootstrap parameters. The workflow also includes a bootstrap session, where a program (e.g., JavaScript code) makes an asynchronous call (e.g., an Ajax call) and passes bootstrap parameters. The server generates the data model and returns it, according to some implementations. In this example workflow, since the workflow requires execution of JavaScript to complete, the mobile client will not be able to load and cache data visualizations in the background. Instead, the server returns the HTML file, the embedded JavaScript and CSS, and the data model in a single response. The parameters needed by the server for bootstrap will be calculated by native mobile code and passed into this request.

In some implementations, the bootstrap include the parameter :offline=true, as well as:
- worksheetPortSize: based on device screen size in logical pixels;
- dashboardPortSize: based on device screen size in logical pixels;
- devicePixelRatio: pixel ratio of the device screen;
- imageSizeLimit: a constant that depends on device resources. In some implementations this defaults to 5,242,880; and
- clientRenderPixelLimit: another constant that depends on device resources. In some implementations, this defaults to 2,096,704.

Figure 5A:
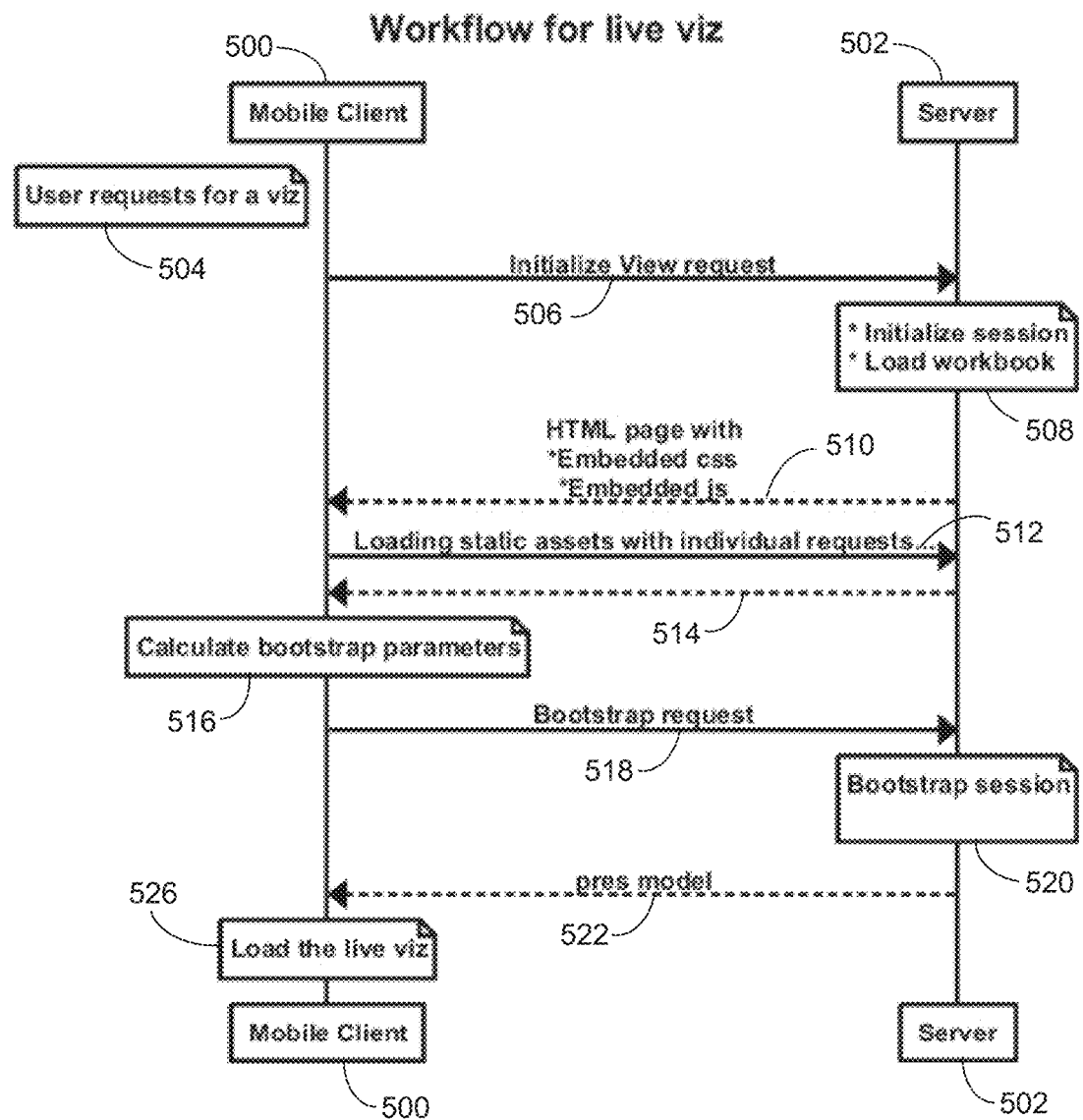
FIGS. 5A and 5B are workflow diagrams for data visualization on a mobile client, according to some implementations.
Figure 5B:
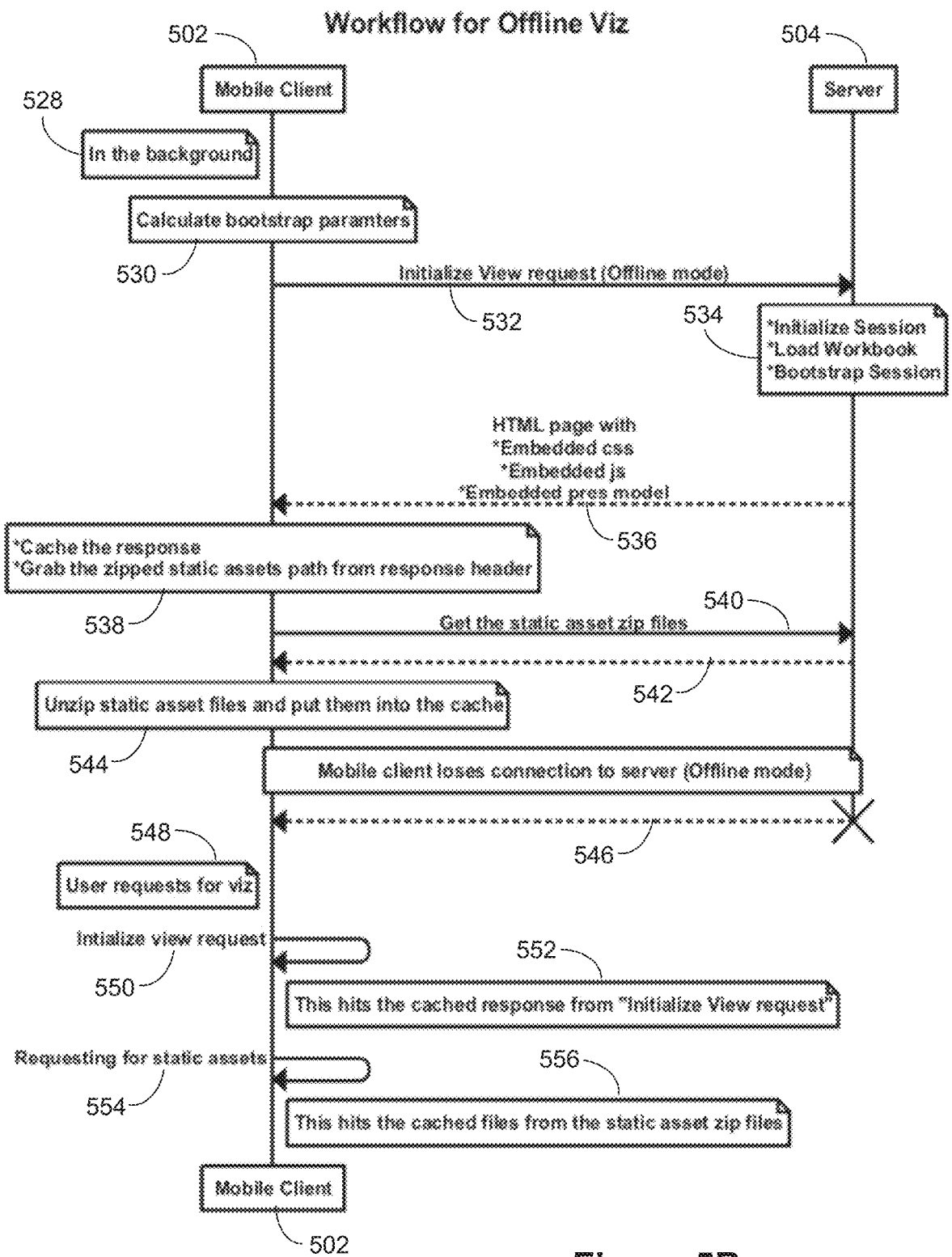

FIGS. 5A and 5B are workflow diagrams for data visualization on a mobile client, according to some implementations. FIG. 5A illustrates a workflow for a live visualization (e.g., when the mobile client is connected to a server). As shown in FIG. 5A, a mobile client 500 receives (504) a user request for a data visualization, and sends an initialize view request 506 to a server 502. In response, the server initializes (508) a session, and loads (508) a data visualization workbook. Based on this initialization, the server sends (510) an HTML page with an embedded cascading style sheet (CSS) and embedded JavaScript. The mobile client 500 loads static assets with individual requests 512 to the server 502, according to some implementations. After the server 502 returns (514) the static assets, the mobile client 500 calculates (516) bootstrap parameters. The mobile client then sends a bootstrap request 518 to the server 502. The server 502 opens a bootstrap session 520, and returns 522 a data model 522 to the mobile client 500. Based on the data model, the mobile client 500 loads 526 the data visualization.

FIG. 5B illustrates a workflow for offline visualization (for when the mobile client is not connected to the server), according to some implementations. The mobile client 502 calculates (530) bootstrap parameters in the background (528), and sends a request (532) to the server 504 to initialize view request in the offline mode. In response, the server 504 initializes (534) a session, loads (534) the data visualization workbook corresponding to the request, and creates (534) a bootstrap session. The server 504 returns to the mobile client 502, an HTML page 536 with the embedded cascading style sheet, JavaScript, and a data model. The mobile client 502 caches 538 the response from the server 504, and finds the path to the static assets based on the response header. The mobile client then sends to the server 504 a request (540) to get the static assets (compressed or zip) files. The server 504 responds by sending (542) the static asset files, which the mobile client unzips (544) and places in a cache. Assume now that the mobile client 502 loses connection to the server 504 (i.e., the mobile client is operating in an offline mode). When the mobile client 502 receives (548) a user request for the data visualization, the mobile client 502 initializes 550 a view request based 552 on the cached response from the initialize view request 532. Similarly, the visualization request results in a request 554 for static assets, which are retrieved (556) from the cache (e.g., the cached files from the static asset zip files stored in step 544). Thus, the mobile client 504 can service requests for data visualizations using cached information in the offline mode.

In some implementations, the initialize view request 532 in the offline mode (in FIG. 5B) is based on the initialize view request 506 (in FIG. 5A). For example, the mobile client 502 can indicate to the server 504 that the request is for an offline mode, and can specify additional query parameters that are used for the bootstrap step, including a parameter for worksheet port size (calculated based on screen size or logical pixels), a dashboard port size (calculated based on screen size or logical pixels), a device pixel ratio (calculated based on pixel ratio of the screen), an image size limit, and a client render pixel limit (both of these last two are fixed as constants based on the mobile device).

In some implementations, JavaScript code runs on the mobile client 502 to load the data model if the data model is embedded in the HTML, and otherwise makes a bootstrap call to retrieve the data model. In some implementations, the JavaScript code also detects that the server is offline (i.e., the mobile client has to operate in an offline mode), and avoids making calls to the server for data visualizations.

In some implementations, in order to avoid having to fetch map tiles, a visualization loaded for offline interactions will have fetched the map tiles composited by the server. The image of the whole map will then be returned in the data model.

In some implementations, the mobile client downloads (from the server) and caches all of the static assets required for loading a visualization offline. In some implementations, there are several sources of static assets that are required for loading a visualization. For example, in some implementations, vizportal and vizqlserver are two of the static assets required. The server compresses or zips the required static assets from the different sources and makes it available for download. In some implementations, the paths to the zip files are the same as the base directory where the static assets are available. In some implementations, this location is specified by the server on the response header of the initialize and bootstrap request so that the mobile client can parse it.

In some implementations, the static assets change based on server upgrades. When updating a given visualization in the cache, the client can recognize if the response header points to different filenames (via some unique identifier generated by the server) for static assets and download the new assets if necessary. Since the new copy of the visualization will be unusable when new static assets are acquired, the old copy is kept until the download of the new copy is complete. There may temporarily be multiple copies of the same visualization in the cache, the multiple copies corresponding to different server versions. Likewise, there may be multiple copies of the static assets in the cache if the cache contains visualizations from different server versions. In some implementations, the client tracks the references from visualizations to static assets so that it can eventually purge unused assets.

In some implementations, in order to keep the contents of the static asset zip files up to date as developers add new files and remove old ones, a manifest file is provided to help manage the list of static assets that are needed for loading a visualization. The manifest file can be used as a reference for different reasons, including for translation to a set of HTTP daemon (httpd) rules that define a set of accessible files within the static asset base directory, and as a reference for all the files that will be put into the zip file, according to some implementations. In some implementations, manifest files are provided for vizportal and vizqlserver, and placed in the respective base directories where the static assets live. In some implementations, the manifest file is a list of file paths, with one path per line. In some implementations, the file paths are relative to the path of the manifest file. In some implementations, the file paths support regular expression pattern matching.

In some implementations, apache rules written to enforce static asset manifest apply when the server is run in specific circumstances controlled with a configuration variable which is turned off in all other environments. When the configuration variable is turned on, an HTTP daemon configuration file (e.g., httpd.conf file) is populated with directives (e.g., DirectoryMatch directives) that will deny access to all the static asset files unless it is included in the manifest, according to some implementations. Additionally, for some static assets (e.g., vizportal static assets), since the HTTP daemon server (e.g., httpd server) needs to allow access to all files for requests coming from vizportal, the source of the request is checked (e.g., by looking at the reference and determining whether an embed parameter is set to true). In some implementations, the size of the static asset zipped or compressed filed is checked at predefined time intervals to make sure the size has not grown beyond an established threshold (e.g., within 20 percent of the initial size).

FIGS. 6A-6L provide a process flow 600 for a method 602 for data visualization offline interaction, according to some implementations. The process 600 is performed (604) at a computer 200 having a display 208, one or more processors 202, and memory 214 storing one or more programs configured for execution by the one or more processors.

In some implementations, the process receives (606) a request (e.g., via user interface 206) from a user for a data visualization. The data visualization is based on a data set retrieved from a database 340 using a set of one or more queries. The process sends (608) the user request for the data visualization to a server 300 communicatively coupled (e.g., via communication interface 304) to the computer. The process receives (610) a visualization payload from the server. The visualization payload includes a data model 232 needed to render the data visualization and a data visualization library (e.g., an HTML page 234 with an embedded CSS and JavaScript, and static assets 236 corresponding to the data model. The data model is stored in a web page (e.g., an HTML, file, an XML file, or a JSON file), according to some implementations.

In some implementations, the data in the data model is aggregated (612) as needed for the data visualization. In some implementations, the data model contains (614) only the data necessary to show a set of active data marks. In some implementations, the data in the data model is sorted and/or filtered (616). In some implementations, the sorting and/or filtering is performed by the server 300. In some implementations, there is a separate download file for each visualization.

The process stores (618) the visualization payload in memory (e.g., in a visualization cache 230) using a caching mechanism 240. The process generates (620) the data visualization based on the data model 232 using the data visualization library. The process displays (622) a data visualization user interface 102 and displays the data visualization in the data visualization interface. The process detects (624) user input (e.g., via input device or mechanism 210) corresponding to a user interface command manipulating the data visualization. The process determines (626) whether the computer has connectivity with the server 300. For example, a module or component (e.g., a module in the data visualization libraries 228) of the client device 200 can ping the server 300 to determine if the client has connectivity with the server. In accordance with a determination (628) that the computer has no connectivity with the server 300, the process determines (630) whether the user interface command corresponds to functionality that is available in the offline mode. In accordance with a determination (632) that the functionality is available in the offline mode, the process retrieves (634) the stored visualization payload from the cache 230, generates (636) a response to the user input based on the data model 232 using the visualization library, and displays (638) the response in the data visualization interface 102. In general, the response comprises displaying an updated data visualization (or else a message as to why the desired operation cannot be performed in offline mode)

Figure 6A:
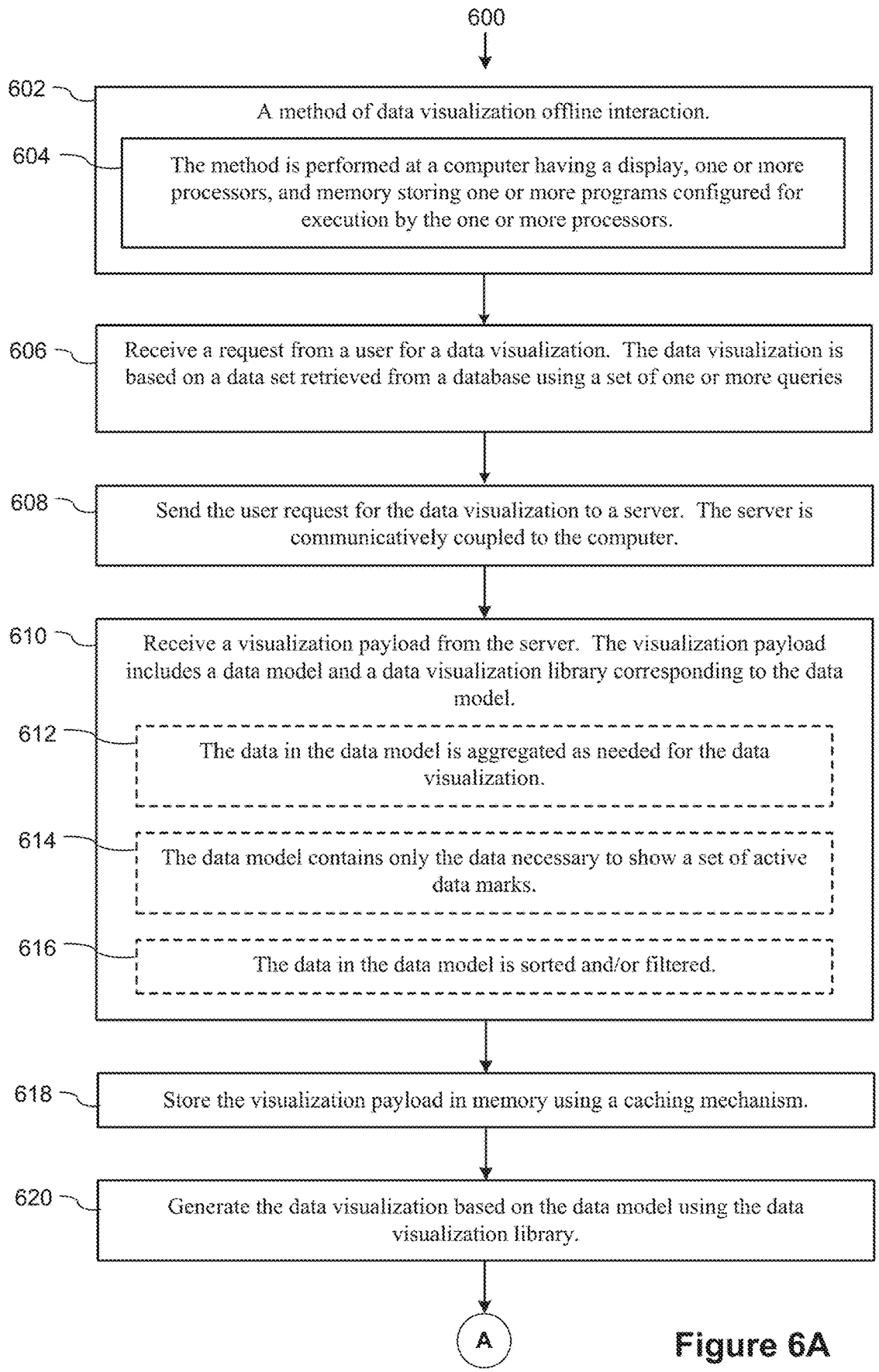
FIGS. 6A-6L provide a process flow for data visualization offline interaction, according to some implementations.
Figure 6B:
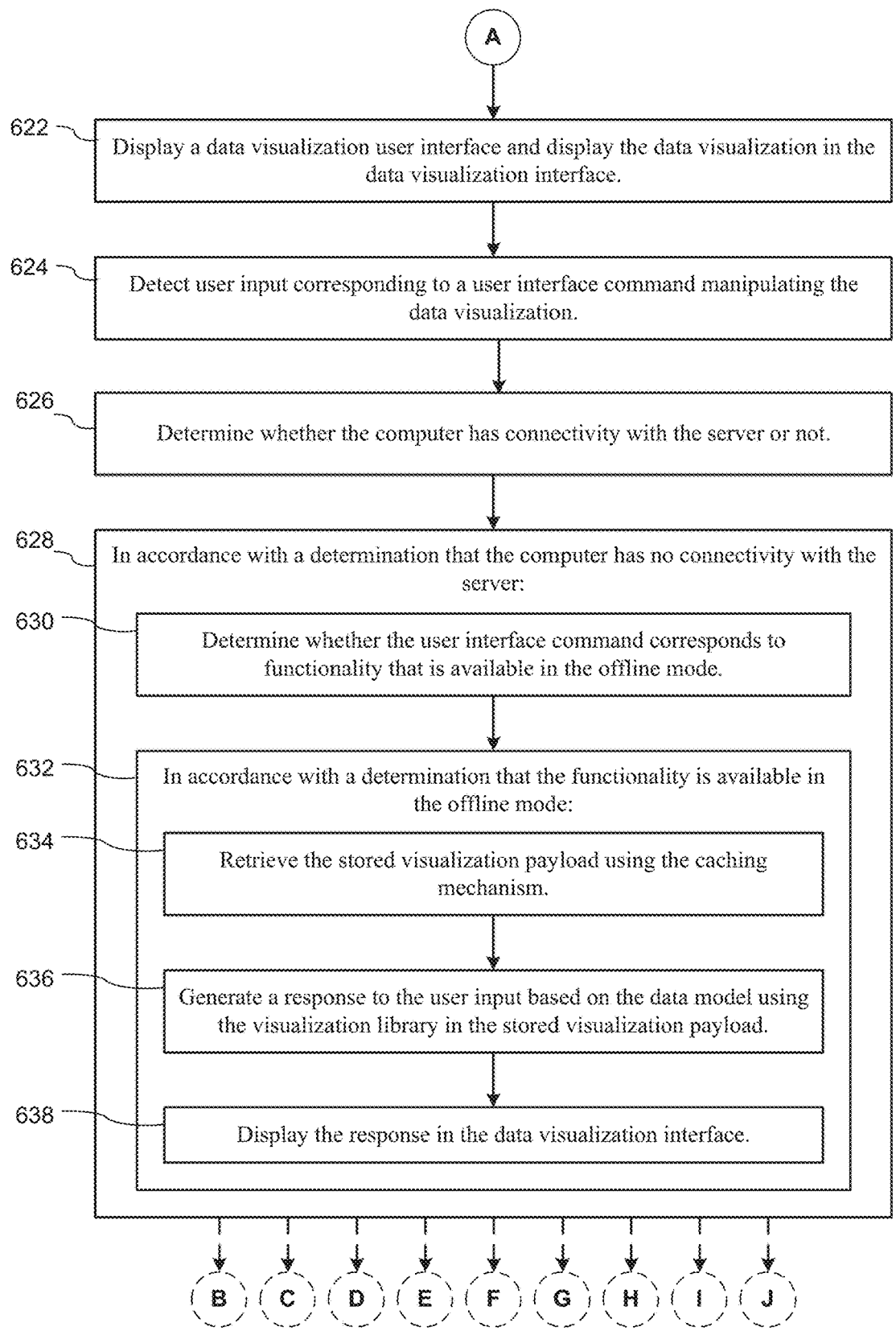
Figure 6C:
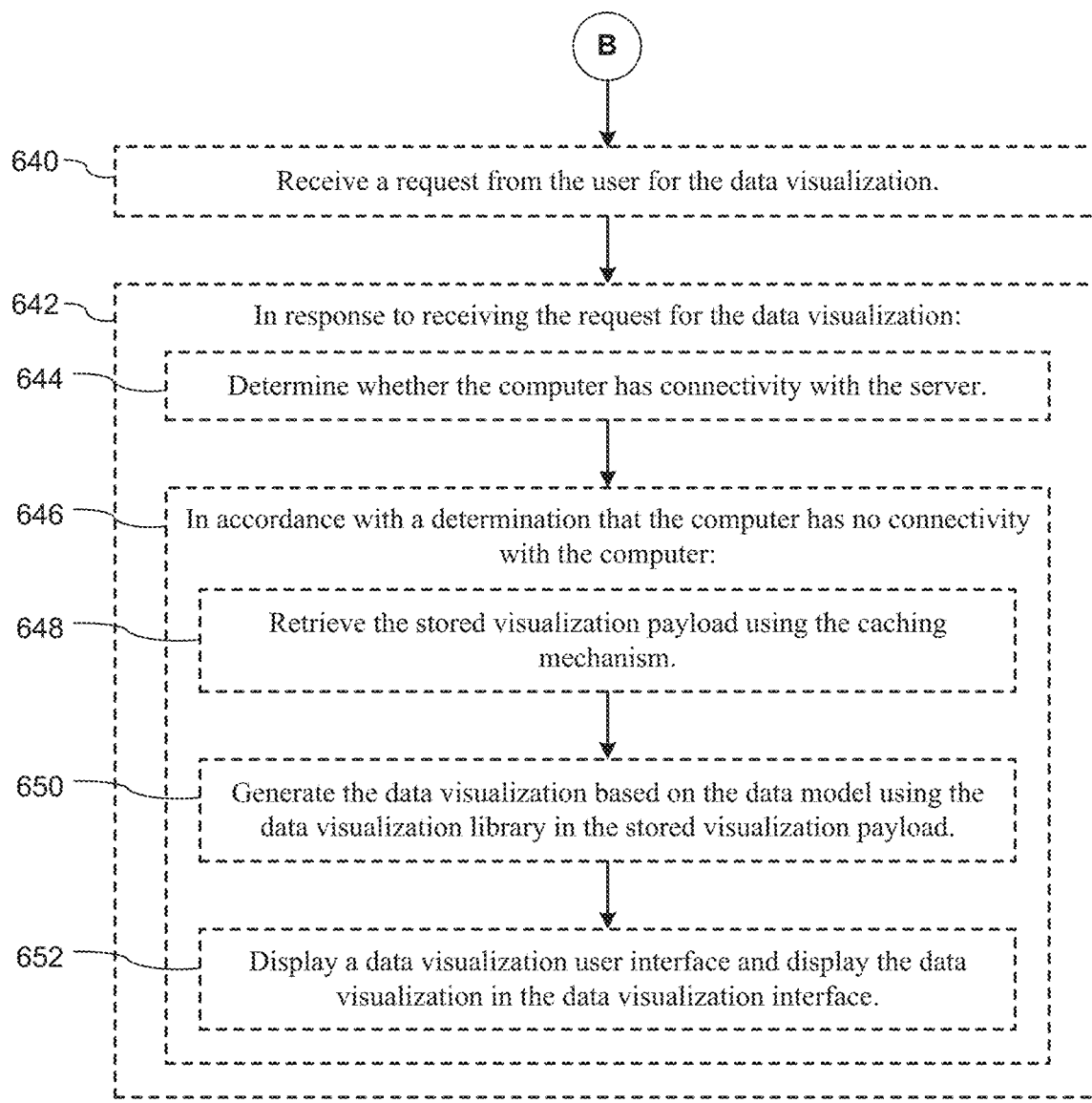

In some implementations, as shown in FIG. 6C, the process includes receiving (640) a request from the user for the data visualization. In response to receiving the request (642) for the data visualization, the process determines (642) whether the computer 200 has connectivity with the server 300. In accordance with a determination (646) that the computer has no connectivity with the server, the process retrieves (648) the stored visualization using the offline caching manager 240, generates (650) the data visualization based on the data model 232 using the data visualization library, and displays (652) a data visualization user interface 102 and displays the data visualization in the data visualization interface.

Figure 6D:
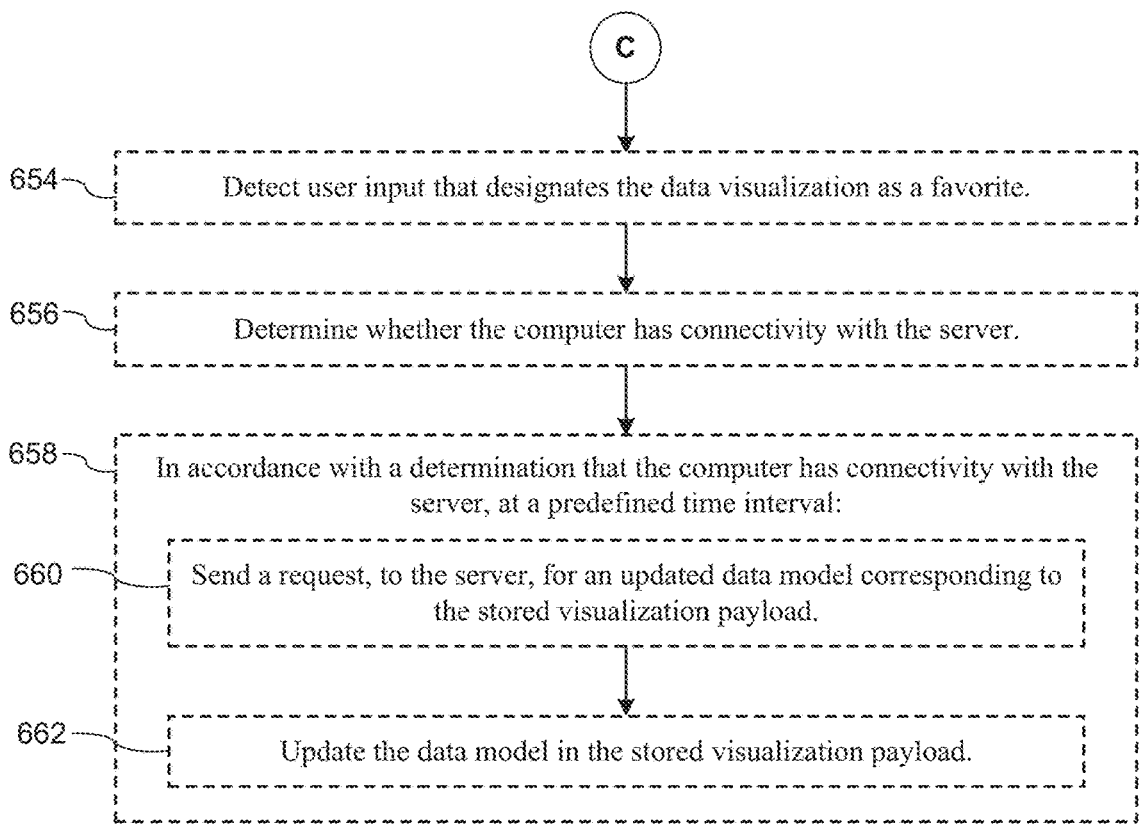

In some implementations, as shown in FIG. 6D, the process detects (654) user input that designates the data visualization as a favorite. The process determines (656) whether the computer 200 has connectivity with the server 300. In accordance with a determination (658) that the computer has connectivity with the server, at a predefined time interval, the process sends (660) a request to the server for an updated data model corresponding to the stored visualization payload, and updates (662) the data model 232 in the cache 230. In some implementations, operations 658, 660, 662 are executed by an offline synchronization manager 242.

Figure 6E:
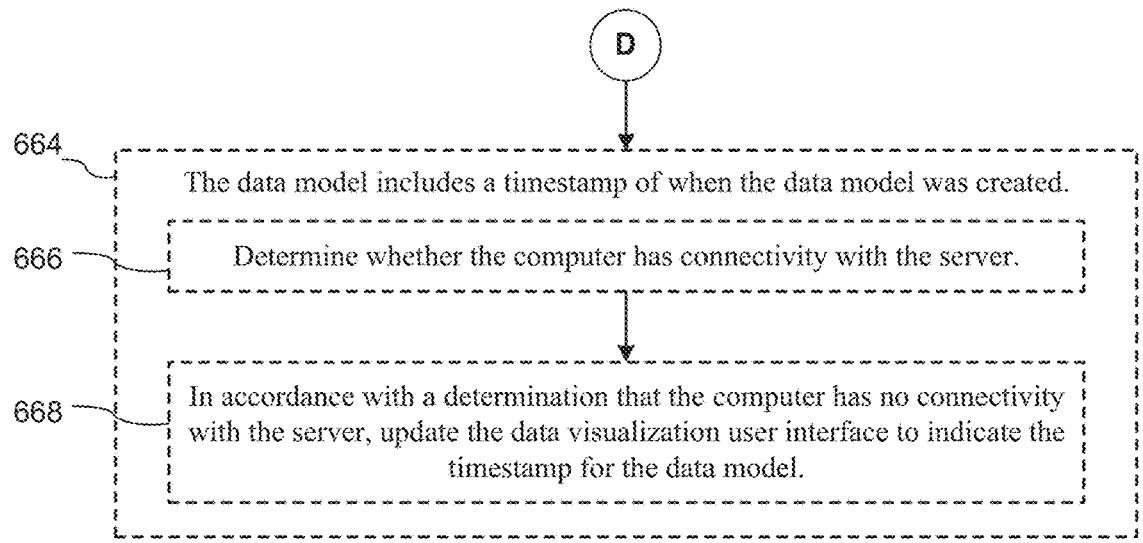

In some implementations, as shown in FIG. 6E, the data model 232 includes (664) a timestamp of when the data model was created, and the process determines (668) whether the computer 200 has connectivity with the server 300. In accordance with a determination that the computer has no connectivity with the server, the process updates (668) the data visualization user interface 102 to indicate the timestamp for the data model. In this way, the user knows how old (e.g., stale) the data is.

Figure 6F:
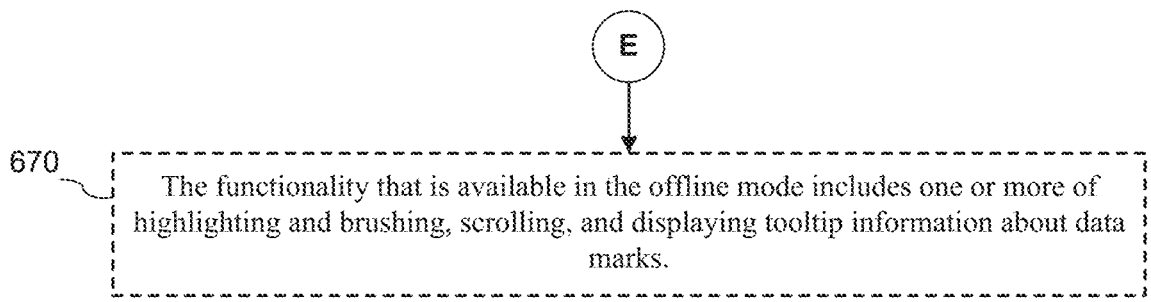

In some implementations, as shown in FIG. 6F, the functionality that is available in the offline mode includes (670) one or more of highlighting and brushing (e.g., selection of marks in one visualization on a dashboard highlights the corresponding marks in other visualizations on the dashboard), and displaying tooltip information about data marks.

Figure 6G:
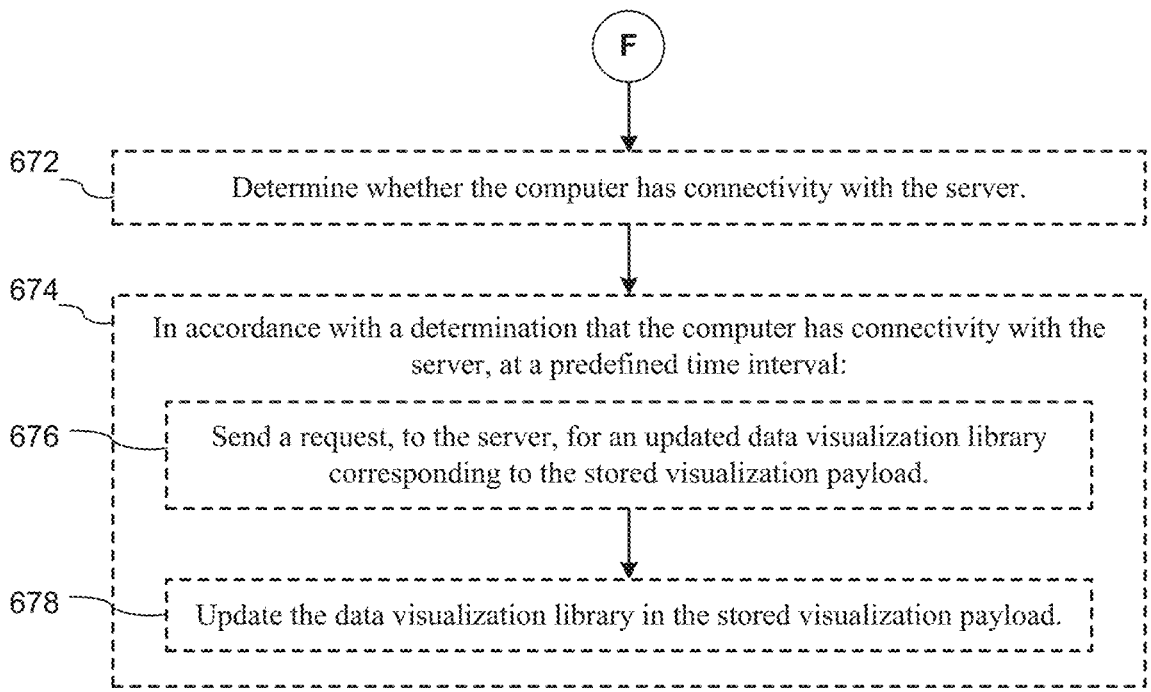

In some implementations, as shown in FIG. 6G, the process determines (672) whether the computer 200 has connectivity with the server 300. In accordance with a determination (674) that the computer has connectivity with the server, at a predetermined time interval (e.g., as defined by a user using the client device 200), the process sends (676) a request to the server for an updated data visualization library, and updates (678) the data visualization library in the cache 230. In some implementations, operations 676 and 678 are executed by an offline synchronization manager 242. In some implementations, a given data model file corresponds to a specific version of the data visualization library (e.g., a JavaScript package), so if the data visualization library (e.g., JavaScript) version for a data model is updated on the server, the client device 200 will download the newer version of the JavaScript package the next time it is connected to the server 200. Note that, in some implementations, a client device 200 can have multiple distinct data visualization library versions (e.g., JavaScript versions) at the same time, and the client device 200 uses the appropriate data visualization library version depending on the version corresponding to the user selected visualization.

Figure 6H:
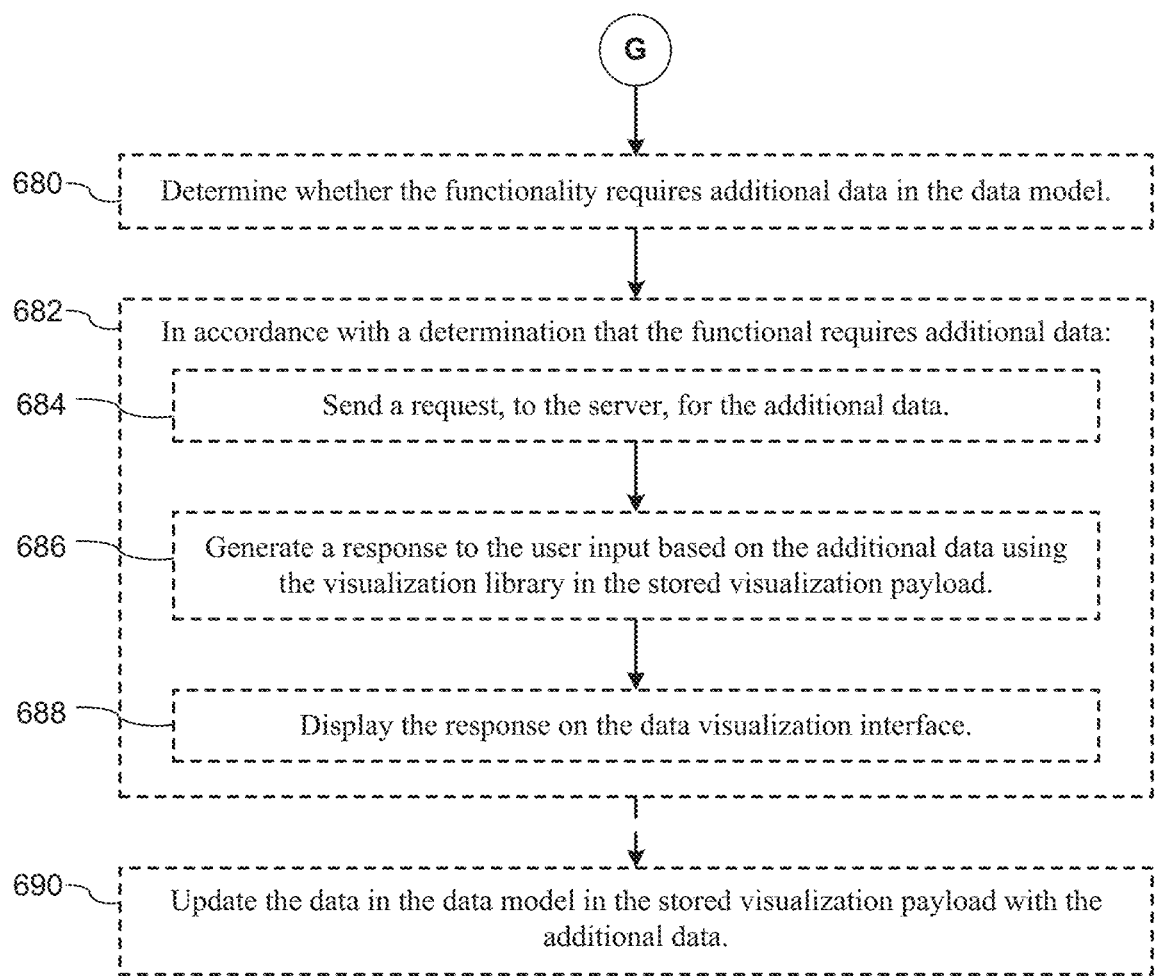

In some implementations, as shown in FIG. 6H, the process determines (680) whether the functionality requires additional data in the data model 232. For example, the process determines that the data in the data model is aggregated, and more granular data is required from the server 300 for implementing the functionality on the client 200. In accordance with a determination (682) that the functionality requires additional data, the process sends (684) a request, to the server 300, for the additional data, generates (686) a response to the user input based on the additional data using the visualization library, and displays (688) the response in the data visualization interface 102. In some implementations, the process also updates (690) the data in the data model 232 in the cache 230 with the additional data from the server. In some implementations, operations 684, 686, and/or operation 690 662 are executed by an offline synchronization manager 242.

In some implementations, some of the functionality requested by the user requires extending the functionality of the data visualization library (e.g., JavaScript files). In some implementations, the available functionality depends on runtime implementations. The functions in the runtime can be executed locally, without a trip to the server. Examples of such runtime implementations are described in U.S. application Ser. No. 14/954,942, titled "Systems and Methods for Interactive Visual Analysis Using A Specialized Virtual Machine," filed Nov. 30, 2015, which is incorporated by reference herein in its entirety.

Figure 6I:
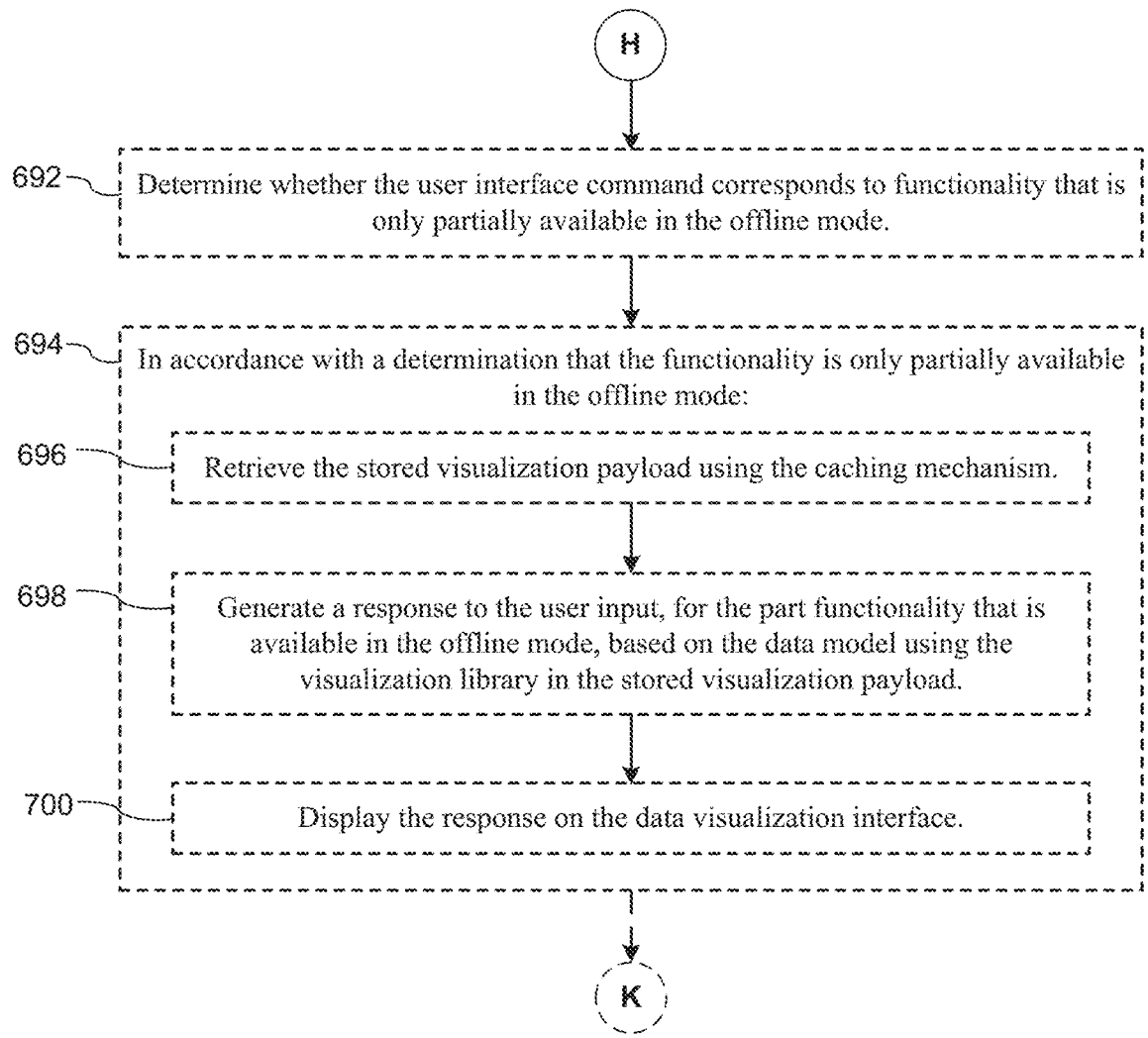
Figure 6J:
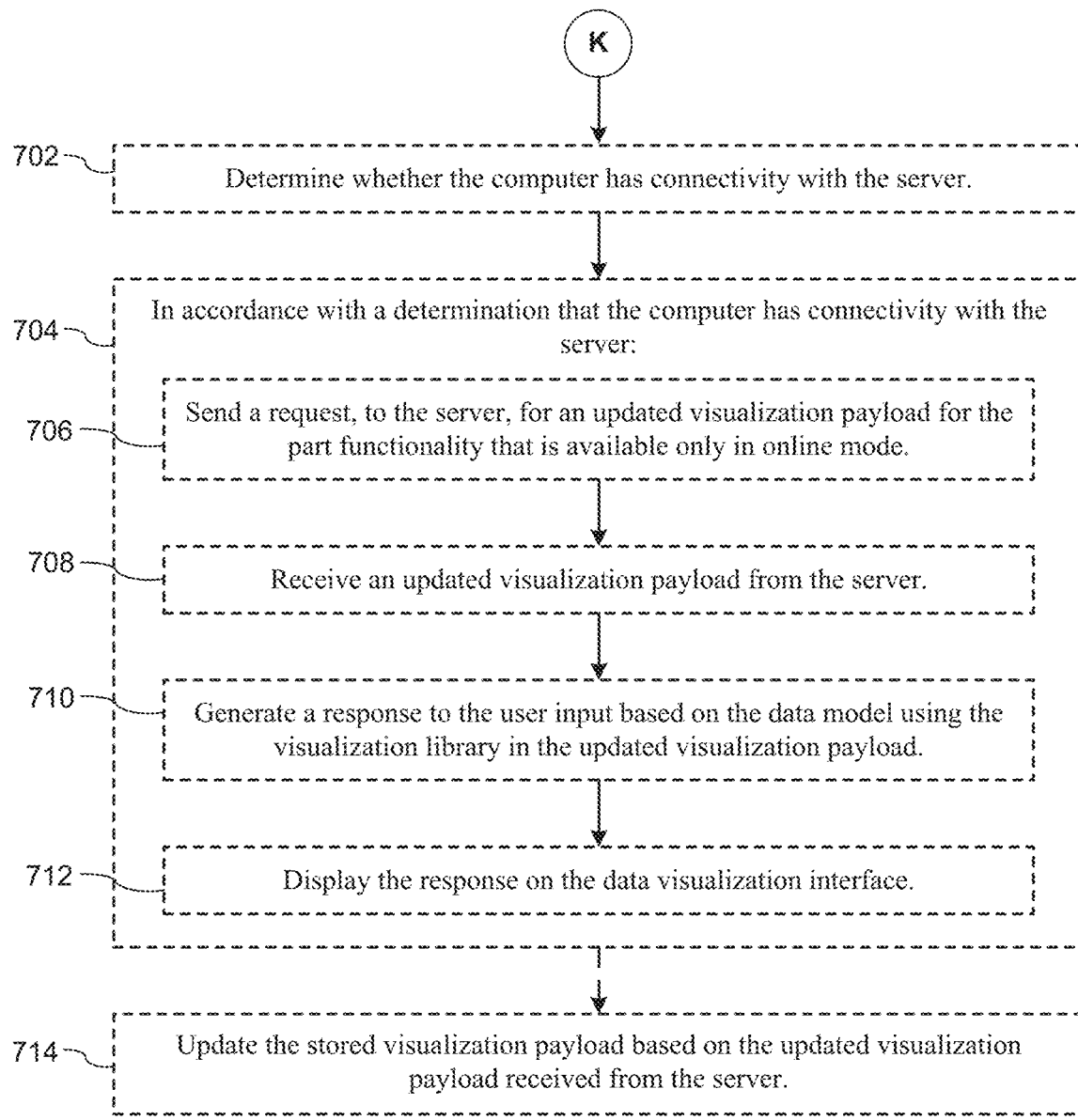

In some implementations, as shown in FIG. 6I, the process determines (692) whether the user interface command corresponds to functionality that is only partially available in offline mode. In accordance with a determination (694) that the functionality is only partially available in offline mode, the process retrieves (696) the stored visualization data from the cache 230, generates (698) a response to the user input for the part functionality that is available in offline mode based on the data model 232 using the visualization library, and displays (700) the response in the data visualization interface 102. In some implementations, as shown in FIG. 6J, the process determines (702) whether the computer has connectivity with the server 300. In accordance with a determination (704) that the computer has connectivity with the server, the process: (i) sends (706) a request to the server, for an updated visualization payload for the part functionality that is available only in online mode; (ii) receives (708) an updated visualization payload from the server; (iii) generates (710) a response to the user input based on the data model 232 using the visualization library; and (iv) displays (712) the response in the data visualization interface 102. In some implementations, the process also updates (714) the stored visualization payload based on the updated visualization payload received from the server. In some implementations, operations 706, 708, and/or operation 714 are executed by an offline synchronization manager 242.

In some implementations, user interface commands can be implemented locally, remotely, or split. Some functionality is inherently remote (e.g., aggregating a terabyte of data to form a small set of aggregated rows). Some functionality is completely local, such as displaying tooltip information about data marks. In some cases, a command consists of two parts. The first part is executed locally, and the second part is executed remotely (e.g., a combination of highlighting and filtering). While connected to the server, all of the functionality is available. When in offline mode, commands that are either local or split are available to the user. For the commands with split execution, only the local part is executed.

Figure 6K:
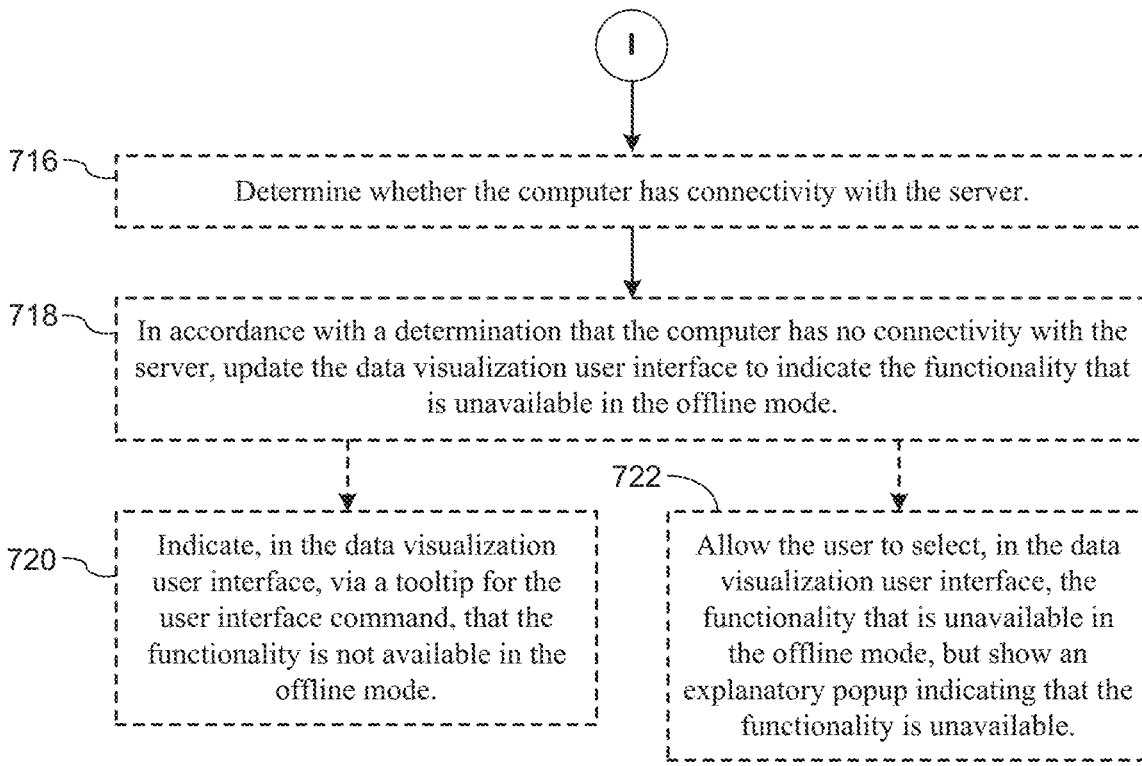

In some implementations, as shown in FIG. 6K, the process determines (716) whether the computer has connectivity with the server. In accordance with a determination that the computer has no connectivity with the server, the process updates (718) the data visualization user interface 102 to indicate (e.g., by dimming or removing) the functionality that is unavailable in the offline mode. In some implementations, the process indicates in the data visualization user interface why some functionality is not available in the offline mode. For example, if functionality requires more data to be fetched from the server 300, the process indicates the reason in the data visualization interface. In some implementations, the process indicates (720), in the data visualization user interface, via a tooltip for the user interface command, that the functionality is not available in offline mode. In some implementations, the process allows (722) the user to select, in the data visualization user interface, the functionality that is unavailable in the offline mode, but shows (722) an explanatory popup indicating that the functionality is unavailable. In some implementations, the process indicates in the data visualization interface 102 the part functionality of the user interface command that is unavailable in the offline mode. For example, the process indicates the portion of a command that can be executed only in the online mode by color coding or highlighting the command in the user interface 102.

Figure 6L:
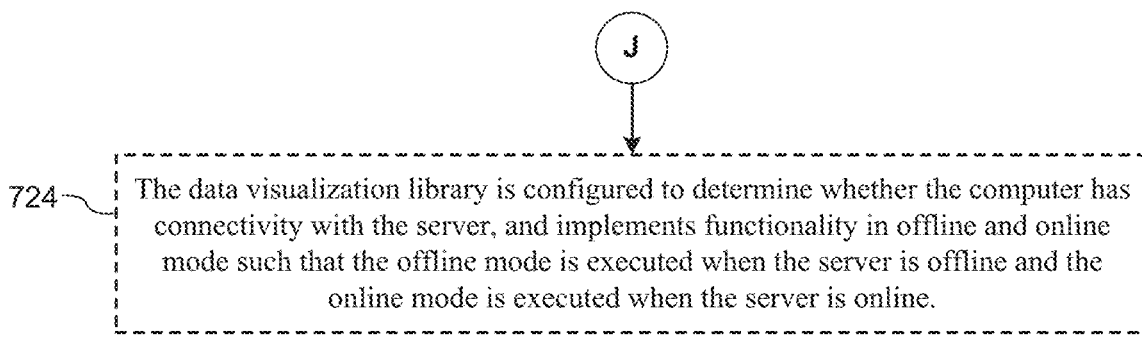

In some implementations, as shown in FIG. 6L, the data visualization library is configured (724) to determine whether the computer 200 has connectivity with the server 300, and implements functionality in offline and online mode so that the offline mode is executed when the server is offline and the online mode is executed when the server is online.

In many instances, the offline interactions with data visualization occur within the data visualization interface 102. However, data visualizations can be embedded in documents, such as a presentation, and the offline mode of operation enables a user of the presentation to interact with the data visualization in real-time using the data in the visualization cache 230.

The JavaScript files used for offline interactions are typically very large (e.g., 100,000 lines of JavaScript). In some implementations, the same JavaScript file that is used by the server to render data visualization is the one that is downloaded to run locally on client devices. However, there are many device differences, so the JavaScript file includes conditional branching for many operations depending on whether the script is running on a server or a client device.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of data visualization offline interaction, comprising:

at a computer having a display, one or more processors, and memory storing one or more programs configured for execution by the one or more processors:
performing at a program stored in the memory:
locally storing, in the memory, using a caching mechanism, a visualization payload for a previously executed data visualization;
receiving a user request to reuse the previously executed data visualization on the display, wherein the data visualization requires a server connection;
determining that the computer has no connectivity with a server required for the data visualization; and
in accordance with a determination that the computer has no connectivity with the server:
retrieving the locally stored visualization payload, wherein the locally stored visualization payload includes a data model representing a dataset retrieved from a database, and wherein (i) the data in the data model is aggregated at a level of detail corresponding to dimension data fields used by the data visualization, (ii) the data model contains only the data necessary to show a set of active data marks, or (iii) the data in the data model is sorted and/or filtered;
generating and displaying a data visualization based on the locally stored visualization payload and a data visualization library;
disabling, on the display, one or more executable user interface affordances for the data visualization, wherein each disabled executable user interface affordance corresponds to a functionality, button, menu, or control for a respective feature that requires connectivity with the server;
detecting user input corresponding to a user interface affordance for a first feature manipulating the data visualization; and
in accordance with a determination that the first feature does not require connectivity with the server:
generating an updated data visualization according to the user input, the locally stored visualization payload, and the data visualization library; and
displaying the updated data visualization.

2. The method of claim 1, further comprising:
    detecting user input that designates the data visualization as a favorite;
    determining whether the computer has connectivity with the server; and
    in accordance with a determination that the computer has connectivity with the server, at a predefined time interval:
        sending a request, to the server, for an updated data model corresponding to the data visualization; and
        storing the updated data model in the memory.
3. The method of claim 1, wherein the data model includes a timestamp of when the data model was created, the method further comprising:
    determining whether the computer has connectivity with the server; and
    in accordance with a determination that the computer has no connectivity with the server, updating a data visualization user interface to indicate the timestamp for the data model.
4. The method of claim 1, further comprising:
    determining whether the computer has connectivity with the server; and
    in accordance with a determination that the computer has connectivity with the server, at a predefined time interval:
        sending a request, to the server, for an updated data visualization library; and
        storing the updated data visualization library in the memory.
5. The method of claim 1, wherein the first feature includes one or more of highlighting, brushing, scrolling, and displaying tooltip information about data marks.
6. The method of claim 1, further comprising:
    determining whether the detected user input corresponds to functionality that is only partially available when the computer has no connectivity with the server; and
    in accordance with a determination that the functionality is only partially available, generating the updated data visualization according to the functionality that is available.
7. The method of claim 1, further comprising:
    determining whether the computer has connectivity with the server; and
    in accordance with a determination that the computer has connectivity with the server:
        sending a request, to the server, for an updated visualization payload for functionality that is available only when the computer has connectivity with the server; and
        receiving the updated visualization payload from the server.
8. The method of claim 7, further comprising storing the updated visualization payload in the memory.
9. The method of claim 1, further comprising:
    determining whether the computer has connectivity with the server; and
    in accordance with a determination that the computer has no connectivity with the server, updating a data visualization user interface to indicate functionality that is unavailable when the computer has no connectivity with the server.
10. The method of claim 9, further comprising indicating, in the data visualization user interface, via a tooltip for a user interface command, that the functionality is unavailable.
11. The method of claim 9, further comprising allowing the user to select, in the data visualization user interface, the functionality that is unavailable but, when the functionality is selected, showing an explanatory popup indicating that the functionality is unavailable.
12. The method of claim 1, wherein the data visualization library is configured to determine whether the computer has connectivity with the server, and implements functionality in offline mode and online mode so that the offline mode is executed when the server is offline and the online mode is executed when the server is online.
13. A computer system for data visualization offline interaction, comprising:
    a display;
    one or more processors;
    memory; and
    one or more programs stored in the memory and configured for execution by the one or more processors, the one or more programs comprising instructions for:
        locally storing, in the memory, using a caching mechanism, a visualization payload for a previously executed data visualization;
        receiving a user request to reuse the previously executed data visualization on the display, wherein the data visualization requires a server connection;
        determining that the computer system has no connectivity with a server required for the data visualization; and
        in accordance with a determination that the computer system has no connectivity with the server:
            retrieving the locally stored visualization payload, wherein the locally stored visualization payload includes a data model representing a dataset retrieved from a database, and wherein (i) data in the data model is aggregated at a level of detail corresponding to dimension data fields used by the data visualization, (ii) the data model contains only the data necessary to show a set of active data marks, or (iii) the data in the data model is sorted and/or filtered;
            generating and displaying a data visualization based on the locally stored visualization payload and a data visualization library;
            disabling, on the display, one or more executable user interface affordances for the data visualization, wherein each disabled executable user interface affordance corresponds to a functionality, button, menu, or control for a respective feature that requires connectivity with the server;
            detecting user input corresponding to a user interface affordance for a first feature manipulating the data visualization; and
            in accordance with a determination that the first feature does not require connectivity with the server:
                generating an updated data visualization according to the user input, the locally stored visualization payload, and the data visualization library; and
                displaying the updated data visualization.
14. The computer system of claim 13, wherein the one or more programs further comprise instructions for:
    detecting user input that designates the data visualization as a favorite;
    determining whether the computer system has connectivity with the server; and
    in accordance with a determination that the computer system has connectivity with the server, at a predefined time interval:

sending a request, to the server, for an updated data model corresponding to the data visualization; and storing the updated data model in the memory.

15. The computer system of claim 13, wherein the one or more programs further comprise instructions for:

determining whether the computer system has connectivity with the server; and in accordance with a determination that the computer system has connectivity with the server, at a predefined time interval:

sending a request, to the server, for an updated data visualization library; and storing the updated data visualization library in the memory.

16. A non-transitory computer readable storage medium storing one or more programs configured for execution by a computer system having a display, one or more processors and memory, the one or more programs comprising instructions for:

locally storing, in the memory, using a caching mechanism, a visualization payload for a previously executed data visualization;

receiving a user request to reuse the previously executed data visualization on the display, wherein the data visualization requires a server connection;

determining that the computer system has no connectivity with a server required for the data visualization; and in accordance with a determination that the computer system has no connectivity with the server:

retrieving the locally stored visualization payload, wherein the locally stored visualization payload includes a data model representing a dataset retrieved from a database, and wherein (i) the data in the data model is aggregated at a level of detail corresponding to dimension data fields used by the data visualization, (ii) the data model contains only the data necessary to show a set of active data marks, or (iii) the data in the data model is sorted and/or filtered;

generating and displaying a data visualization based on the locally stored visualization payload and a data visualization library;

disabling, on the display, one or more executable user interface affordances for the data visualization, wherein each disabled executable user interface affordance corresponds to a functionality, button, menu, or control for a respective feature that requires connectivity with the server;

detecting user input corresponding to a user interface affordance for a first feature manipulating the data visualization; and in accordance with a determination that the first feature does not require connectivity with the server:

generating an updated data visualization according to the user input, the locally stored visualization payload, and the visualization library; and displaying the updated data visualization.

* * * * *